United States Patent
Muto et al.

(10) Patent No.: US 12,378,474 B2
(45) Date of Patent: Aug. 5, 2025

(54) LIQUID-CRYSTAL COMPOSITION CONTAINING ANTHRAQUINONE COMPOUND AND LIGHT-MODULATING ELEMENT

(71) Applicant: Nippon Kayaku Kabushiki Kaisha, Tokyo (JP)

(72) Inventors: Hitomi Muto, Tokyo (JP); Kohei Ohtani, Tokyo (JP); Saori Suzuki, Tokyo (JP); Takashi Yoshimoto, Tokyo (JP); Masakazu Shiraishi, Tokyo (JP); Kanae Ogawa, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 18/267,853

(22) PCT Filed: Jan. 19, 2022

(86) PCT No.: PCT/JP2022/001831
§ 371 (c)(1),
(2) Date: Jun. 16, 2023

(87) PCT Pub. No.: WO2022/158493
PCT Pub. Date: Jul. 28, 2022

(65) Prior Publication Data
US 2024/0141234 A1    May 2, 2024

(30) Foreign Application Priority Data
Jan. 21, 2021  (JP) .................. 2021-007694

(51) Int. Cl.
*C09K 19/60*  (2006.01)
*C09K 19/54*  (2006.01)

(52) U.S. Cl.
CPC .......... *C09K 19/603* (2013.01); *C09K 19/542* (2013.01)

(58) Field of Classification Search
CPC .................................................. C09K 19/60
See application file for complete search history.

(56) References Cited

U.S. PATENT DOCUMENTS

2015/0218455 A1*  8/2015  Xu ................. C09K 19/586
252/586

FOREIGN PATENT DOCUMENTS

| CN | 103235445 A | 8/2013 |
|----|-------------|--------|
| CN | 108663866 A | 10/2018 |
| JP | 62-5941 A | 1/1987 |
| JP | 2000-336366 A | 12/2000 |
| JP | 2003-167238 A | 6/2003 |
| JP | 2003-167239 A | 6/2003 |
| JP | 5659512 B2 | 1/2015 |

OTHER PUBLICATIONS

International Search Report and Written Opinion mailed Mar. 8, 2022 in corresponding PCT application No. PCT/JP2022/001831.

* cited by examiner

Primary Examiner — Chanceity N Robinson
(74) Attorney, Agent, or Firm — Nields, Lemack & Frame, LLC

(57) ABSTRACT

Liquid-crystal composition comprising (A) dye compounds and
(B) a liquid crystal material, wherein the dye compounds (A) include an anthraquinone compound represented by general formula (1) and an anthraquinone compound represented by general formula (2) in a specific proportion and further include a dye compound which is neither the anthraquinone compound represented by general formula (1) nor the anthraquinone compound represented by general formula (2), The liquid-crystal composition also may include the (A) and (B) components and further containing (C) a photocurable compound and (D) a photopolymerization initiator A cured object obtained from the liquid-crystal composition, and a light-modulating element in which the liquid-crystal composition or the cured object is sandwiched therein are also set forth.

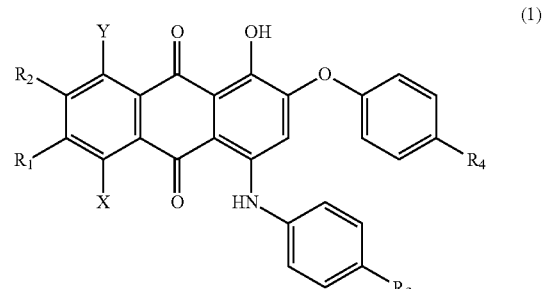

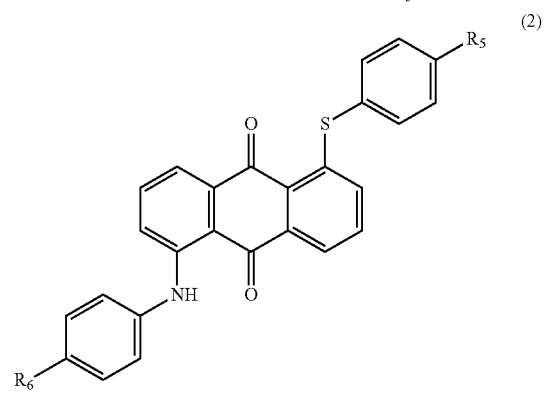

20 Claims, No Drawings

LIQUID-CRYSTAL COMPOSITION CONTAINING ANTHRAQUINONE COMPOUND AND LIGHT-MODULATING ELEMENT

TECHNICAL HELD

The present invention relates to a liquid crystal composition containing anthraquinone compounds, and a light control element containing the liquid crystal composition or a photocured product of the composition.

BACKGROUND ART

In windows, doors, partitions, and the like of vehicles such as trains and automobiles, or buildings such as business buildings and hospitals, for the purpose of protecting privacy and the like, films instead of a blind have been generally used as a light control panel. Such Films include a film obtained by dispersing a liquid crystal in a polymer, and a film with a light control layer utilizing properties that a liquid crystal substance is phase-separated during photo-curing of a composition containing the liquid crystal and a photocurable compound. Usually, such a light control panel can block the field of view by controlling transmission and scattering o light depending on whether or not a voltage is applied. However, since such a light control panel cannot block light itself, glare tends to increase due to light scattering. Therefore, for the purpose of reducing glare, improving contrast, and the like, at tempts have been made to use a dye as a material of the light control panel. For example, in the case of using such a light control panel in a window glass of an automobile, good visibility without haze during transmission as well as high light shielding properties during scattering are required. Therefore, there has been a growing demand for a black element capable of blocking visible light from the viewpoint of practicality and designability.

In order to satisfy the above-mentioned market demand, various liquid crystal display elements called GH (guest-host) type elements, which use a liquid crystal composition containing a dye, have been proposed. These liquid crystal display elements having characteristics in a viewing angle, brightness, and the like have been put into practical use in in-vehicle applications and light control element applications.

Dichroic dyes commonly used in liquid crystal compositions for light control elements are required to have light resistance. UV resistance, heat resistance, compatibility (solubility) with components of the liquid crystal composition, and the like, in addition to the contrast when used in an element. Attempts have been made to improve these characteristics, but in the case of a black light control element, there has been a problem of a color residue of the light control element during light transmission, A color residue during transmission causes poor visibility, and thus it is desirable to bring the light close to colorless and transparent. In particular, since light in the red region is highly visible, it is important not to leave the color in this region. Although the dichroic dyes described in Patent Literatures 1 and 2 have improved light resistance and contrast, they do not satisfy market requirements for a color residue during transmission.

CITATION LIST

Patent Literatures

PATENT LITERATURE 1: JP-A-2000-336366
PATENT LITERATURE 2: JP-B-5659512

SUMMARY OF INVENTION

Technical Problem

A primary object of the present invention is to provide a novel liquid crystal composition containing dye compounds each having a specific structure.

Another object of the present invention is to provide a light control element that contains the liquid crystal composition or a cured product of the liquid crystal composition and is excellent in contrast and an effect of reducing red coloring during transmission.

Solution to Problem

As a result of intensive studies, the present inventors have found a novel liquid crystal composition that contains a plurality of kinds of anthraquinone compounds (dichroic dyes) each having a specific structure, and a dye compound other than the anthraquinone compounds.

The present inventors have also found that use of such a novel liquid crystal composition can provide a light control element excellent in contrast and an effect of reducing red coloring during transmission.

That is, the present invention includes the following aspects and/or embodiments.

(1).
A liquid crystal composition comprising:
(A) dye compounds; and
(B) a liquid crystal material, wherein
the dye compounds (A) include:
 (i) an anthraquinone compound represented by general formula (1):

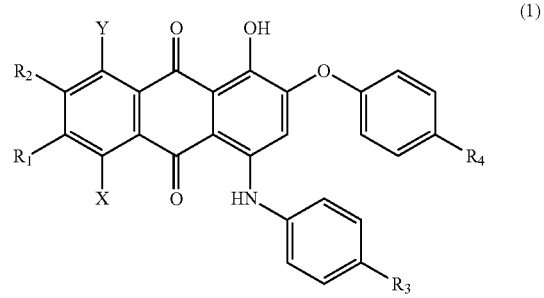

wherein one of X and Y represents a hydroxy group, and another of X and Y represents a hydrogen atom, a hydroxy group, or an amino group,
one of $R_1$ and $R_2$ represents a hydrogen atom, and another of $R_1$ and $R_2$ represents a substituent represented by formula (a):

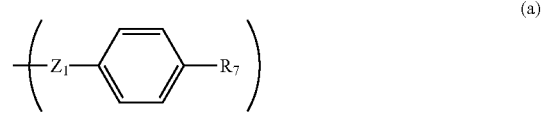

wherein $R_7$ represents a linear or branched alkyl group having 4 to 12 carbon atoms, a linear or branched alkoxy group having 4 to 12 carbon atoms, or a substituent represented by formula (b):

wherein $R_8$ represents a linear or branched alkyl group having 1 to 12 carbon atoms, and $Z_1$ represents an oxygen atom or a sulfur atom, provided that when X is a hydroxy group and Y is a hydrogen atom or an amino group, $R_1$ represents a substituent represented by formula (a), and $R_2$ represents a hydrogen atom, and when X is a hydrogen atom or an amino group and Y is a hydroxy group, $R_1$ represents a hydrogen atom, and $R_2$ represents a substituent represented by formula (a), $R_3$ represents a hydrogen atom, a linear or branched alkyl group having 1 to 12 carbon atoms, a linear or branched alkoxy group having 1 to 12 carbon atoms, or a substituent represented by formula (b), and $R_4$ represents a linear or branched alkyl group having 4 to 12 carbon atoms, a linear or branched alkoxy group having 4 to 12 carbon atoms, or a substituent represented by formula (b);

(ii) an anthraquinone compound represented by general formula (2):

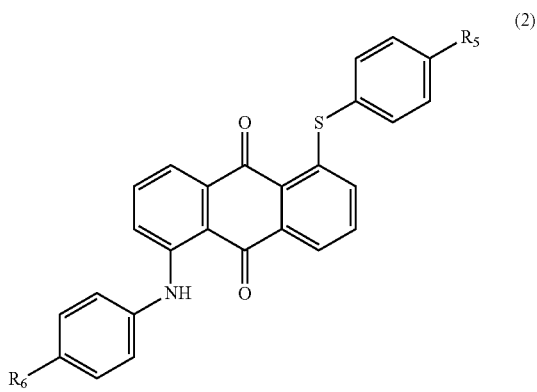

wherein $R_5$ represents a linear or branched alkyl group having 1 to 18 carbon atoms or a linear or branched alkoxy group having 1 to 18 carbon atoms, and $R_6$ represents a linear or branched alkyl group having 1 to 18 carbon atoms, a linear or branched alkoxy group having 1 to 18 carbon atoms, or a substituent represented by formula (b); and (iii) a dye compound other than the anthraquinone compound represented by general formula (1) or the anthraquinone compound represented by general formula (2) (that is, a dye compound that is not the anthraquinone compound represented by general formula (1) and is not the anthraquinone compound represented by general formula (2)), and a mass ratio between the anthraquinone compound represented by general formula (1) and the anthraquinone compound represented by general formula (2) is from 2:1 to 1:2.

(2).
The liquid crystal composition according to item (1), wherein X is a hydroxy group, Y is an amino group, $R_1$ is a substituent represented by formula (a); and $Z_1$ is an oxygen atom.

(3).
The liquid crystal composition according to item (2), wherein $R_4$ and $R_7$ are each independently a linear or branched alkyl group having 6 to 12 carbon atoms or a linear or branched alkoxy group having 6 to 12 carbon atoms.

(4).
The liquid crystal composition according to item (3), wherein $R_3$ is a linear or branched alkyl group having 4 to 7 carbon atoms or a linear or branched alkoxy group having 4 to 7 carbon atoms, (5).
The liquid crystal composition according to item (2), wherein $R_4$ and $R_7$ are each independently a substituent represented by formula (b), and $R_3$ is a linear or branched alkyl group having 1 to 8 carbon atoms or a linear or branched alkoxy group having 1 to 8 carbon atoms.

(6)
The liquid crystal composition according to item (5), wherein $R_4$ and $R_7$ are each independently a substituent represented by formula (b), and $R_8$ is a linear or branched alkyl group having 3 to 8 carbon atoms.

(7).
The liquid crystal composition according to any one of items (1) to (6), further comprising:
(C) a photocurable compound; and
(D) a photopolymerization initiator.

(8).
The liquid crystal composition according to item (7), wherein the photocurable compound (C) contains a monofunctional monomer having one polymerizable functional group and a bifunctional monomer having two polymerizable functional groups.

(9).
The liquid crystal composition according to item (8), wherein the photocurable compound (C) contains a mono(meth)acrylate compound and a di(meth)acrylate compound.

(10).
A cured product of the liquid crystal composition according to any one of items (7) to (9).

(11).
A light control element comprising:
a pair of substrates being arranged to face each other, at least one of the substrates being a transparent substrate having a transparent electrode; and
the liquid crystal composition according to any one of items (1) to (6) or the cured product according to item (10), which is sandwiched between the substrates.

(12).
The light control element according to item (11), having a hue value $a^*$ of 5.0 or less, the hue value $a^*$ being determined by a method defined in JIS Z 8781-4:2013 in a state where a voltage is applied between the pair of substrates.

(13).
The light control element according to item (11) or (12), wherein
when a voltage is applied between the pair of substrates, a difference between a smallest transmittance value and a largest transmittance value among minimum transmittances in a wavelength range of 420 to 460 nm, a wavelength range of 520 to 590 nm, and a wavelength range of 600 to 640 nm is 6% or less, and when no voltage is applied, a difference between a smallest transmittance value and a largest transmittance value among minimum transmittances in a wavelength range of 420 to 460 nm, a wavelength range of 520 to 590 nm. and a wavelength range of 600 to 640 nm is 6% or less.

In addition, the "anthraquinone compound" referred to in the present description means a compound (dye) having an anthraquinone structure as the backbone.

Advantageous Effects of Invention

Use of the liquid crystal composition of the present invention can provide a light control element excellent in contrast and an effect of reducing red coloring during transmission.

DESCRIPTION OF EMBODIMENTS

Hereinafter, the present invention will be described in detail.

The liquid crystal composition of the present invention (hereinafter sometimes simply referred to as "composition of the present invention") contains an anthraquinone compound represented by formula (1).

The anthraquinone compound represented by formula (1) contained in the composition of the present invention functions as a dichroic dye in the composition of the present invention.

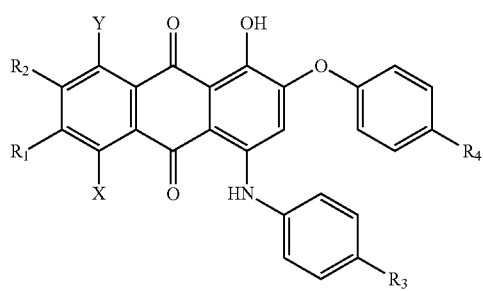

(1)

In formula (1), one of X and Y represents a hydroxy group, and the other of X and Y represents a hydrogen atom, a hydroxy group, or an amino group, and one of $R_1$ and $R_2$, represents a hydrogen atom, and the other of $R_1$ and $R_2$ represents a substituent represented by formula (a), provided that when X is a hydroxy group and Y is a hydrogen atom or an amino group, $R_1$ represents a substituent represented by formula (a), and $R_2$ represents a hydrogen atom, and when X is a hydrogen atom or an amino group and Y is a hydroxy group. $R_1$ represents a hydrogen atom, and $R_2$ represents a substituent represented by formula (a). It is preferable that X is a hydroxy group, Y is an amino group, $R_1$ is a substituent represented by formula (a), and $R_2$ is a hydrogen atom. $R_3$ represents a hydrogen atom, a linear or branched alkyl group having 1 to 12 carbon atoms, a linear or branched alkoxy group having 1 to 12 carbon atoms, or a substituent represented by formula (b). $R_4$ represents a linear or branched alkyl group having 4 to 12 carbon atoms, a linear or branched alkoxy group having 4 to 12 carbon atoms, or a substituent represented by formula (b).

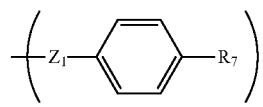

(a)

In formula (a) $R_7$ represents a linear or branched alkyl group having 4 to 12 carbon atoms, a linear or branched alkoxy group having 4 to 12 carbon atoms, or a substituent represented by formula (b). $Z_1$ represents an oxygen atom or a sulfur atom. $Z_1$ is preferably an oxygen atom.

Specific examples of the linear or branched alkyl group having 4 to 12 carbon atoms represented by $R_7$ in formula (a) include a n-butyl group, an iso-butyl group, a sec-butyl group, a t-butyl group, a n-pentyl group, an iso-pentyl group, a neo-pentyl group, a t-pentyl group, a n-hexyl group, a n-heptyl group, a n-octyl group, a n-nonyl group, a n-decyl group, a n-undecyl group, and a n-dodecyl group. A linear or branched alkyl group having 6 to 12 carbon atoms, such as a n-hexyl group, a n-heptyl group, a n-octyl group, a n-nonyl group, a n-decyl group, a n-undecyl group, or a n-dodecyl group is preferable, a linear or branched alkyl group having 6 to 9 carbon atoms is more preferable, and a linear or branched alkyl group having 7 or 8 carbon atoms is still more preferable.

The linear or branched alkoxy group haying 4 to 12 carbon atoms represented by $R_7$ in formula (a) is a substituent in which a linear or branched alkyl group having 4 to 12 carbon atoms and an oxygen atom are bonded together. Specific examples of the alkyl group (i.e., the alkyl group present in the alkoxy group) include groups that are the same as the specific examples of the linear or branched alkyl group having 4 to 12 carbon atoms represented by $R_7$ in formula (a). Specific examples of the linear or branched alkoxy group having 4 to 12 carbon atoms include a n-butyloxy group, an iso-butyloxy group, a t-butyloxy group, a n-pentyloxy group, an iso-pentyloxy group, a neo-pentyloxy group, a t-pentyloxy group, a n-hexyloxy group, a n-heptyloxy group, a n-nonyloxy group, a n-decyloxy group, a n-undecyloxy group, and a n-dodecyloxy group. A linear or branched alkoxy group having 6 to 12 carbon atoms, such as a n-hexyloxy group, a n-heptyloxy group, a n-octyloxy group, or a n-dodecyloxy group is preferable, a linear or branched alkoxy group having 6 to 9 carbon atoms is more preferable, and a linear or branched alkoxy group having 7 or 8 carbon atoms is still more preferable.

Specific examples of the linear or branched alkyl group having 1. to 12 carbon atoms represented by $R_3$ in formula (1) include a methyl group, an ethyl group, a n-butyl group, an iso-butyl group, a sec-butyl group, a t-butyl group, a n-pentyl group, an iso-pentyl group, a neo-pentyl group, a t-pentyl group, a hexyl group, a heptyl group, an octyl group, and a nonyl group. A n-butyl group, a t-butyl group, a n-pentyl group, a n-hexyl group, a n-heptyl group, a n-octyl group, or a n-dodecyl group is preferable.

More specifically, the number of carbon atoms of the linear or branched alkyl group having 1 to 12 carbon atoms represented by $R_3$ in formula (1) is preferably 4 to 7 when $R_4$ and $R_7$ are alkyl groups, and is preferably 1 to 8, and more preferably 3 to 8 when $R_4$ and $R_7$ are substituents represented by (b).

The linear or branched alkoxy group having 1 to 12 carbon atoms represented by $R_3$ in formula (1) is a substituent in which a linear or branched alkyl group having 1 to 12 carbon atoms and an oxygen atom are bonded together.

Specific examples of the alkyl group (i.e., the alkyl group present in the alkoxy group) include groups that are the same as the specific examples of the alkyl group having 1 to 12 carbon atoms represented by $R_3$ in formula (1). Specific examples of the linear or branched alkoxy group having 1 to 12 carbon atoms include a methyloxy group, an ethyloxy group, a n-butyloxy group, an iso-butyloxy group, a t-butyloxy group, a n-pentyloxy group, an iso-pentyloxy group, a neo-pentyloxy group, a t-pentyloxy group, a n-hexyloxy group, a n-heptyloxy group, a n-nonyloxy group, a n-decyloxy group, a n-undecyloxy group, and a n-dodecyloxy group. A n-butyloxy group, a t-butyloxy group, a n-pentyloxy group, a n-hexyloxy group, a n-heptyloxy group, a n-octyloxy group, or a n-dodecyloxy group is preferable.

More specifically, the number of carbon atoms of the linear or branched alkoxy group having 1 to 12 carbon atoms represented by $R_3$ in formula (1) is preferably 4 to 7 when $R_4$ and $R_7$ are alkyl groups, and is preferably 1 to 8, and more preferably 3 to 8 when $R_4$ and $R_7$ are substituents represented by formula (b).

Specific examples of the linear or branched alkyl group having 4 to 12 carbon atoms represented by $R_4$ in formula (1) include a n-butyl group, an iso-butyl group, a sec-butyl group, a t-butyl group, a n-pentyl group, an iso-pentyl group, a neo-pentyl group, a t-pentyl group, a hexyl group, a heptyl group, an octyl group, and a nonyl group. A linear or branched alkyl group having 6 to 12 carbon atoms, such as a n-hexyl group, a n-heptyl group, a n-octyl group, or a n-dodecyl group is preferable, a linear or branched alkyl group having 6 to 9 carbon atoms is more preferable, and a linear or branched alkyl group having 7 to 8 carbon atoms is still more preferable.

The linear or branched alkoxy group having 4 to 12 carbon atoms represented by $R_4$ in formula (1) is a substituent in which a linear or branched alkyl group having 4 to 12 carbon atoms and an oxygen atom are bonded together. Specific examples of the alkoxy group include a n-butyloxy group, an iso-butyloxy group, a t-butyloxy group, a n-pentyloxy group, an iso-pentyloxy group, a neo-pentyloxy group, a t-pentyloxy group, a n-hexyloxy group, a n-heptyloxy group, a n-nonyloxy group, a n-decyloxy group, a n-undecyloxy group, and a n-dodecyloxy group. A linear or branched alkoxy group having 6 to 12 carbon atoms, such as a n-hexyloxy group, a n-heptyloxy group, a n-octyloxy group, or a n-dodecyloxy group is preferable, a linear or branched alkoxy group having 6 to 9 carbon atoms is more preferable, and a linear or branched alkoxy group having 7 to 8 carbon atoms is still more preferable.

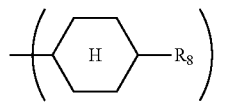
(b)

In formula (b), $R_8$ represents a linear or branched alkyl group having 1 to 12 carbon atoms.

Specific examples of the linear or branched alkyl group having 1 to 12 carbon atoms represented by $R_8$ in formula (b) include a methyl group, an ethyl group, a n-butyl group, an iso-butyl group, a sec-butyl group, a t-butyl group, a n-pentyl group, an iso-pentyl group, a neo-pentyl group, a t-pentyl group, a hexyl group, a heptyl group, an octyl group, and a nonyl group. A n-butyl group, a t-butyl group, a n-pentyl group, a n-hexyl group, a n-heptyl group, a n-octyl group, or a n-dodecyl group is preferable.

In the composition of the present invention, a plurality of anthraquinone compounds encompassed within the definition of formula (1) may be used in combination.

The composition of the present invention contains an anthraquinone compound represented by formula (2).

The anthraquinone compound represented by formula (2) contained in the composition of the present invention functions as a dichroic dye in the composition of the present invention.

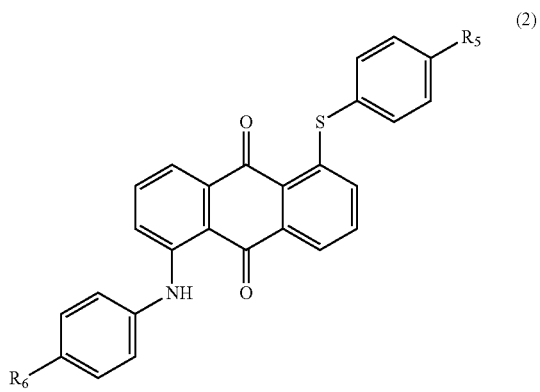
(2)

In formula (2), $R_5$ represents a linear or branched alkyl group having 1 to 18 carbon atoms or a linear or branched alkoxy group having 1 to 18 carbon atoms. $R_6$ represents a linear or branched alkyl group having 1 to 18 carbon atoms, a linear or branched alkoxy group having 1 to 18 carbon atoms, or a substituent represented by formula (b).

Specific examples of the linear or branched alkyl group having 1 to 18 carbon atoms represented by $R_5$ in formula (2) include a methyl group, an ethyl group, a n-butyl group, an iso-butyl group, a sec-butyl group, a t-butyl group, a n-pentyl group, an iso-pentyl group, a neo-pentyl group, a t-pentyl group, a hexyl group, a heptyl group, an octyl group, a nonyl group, a n-decyl group, a n-undecyl group, and a n-dodecyl group. A linear or branched alkyl group having 1 to 8 carbon atoms, such as a methyl group, a n-butyl group, a sec-butyl group, a t-butyl group, a hexyl group, a heptyl group, or an octal group is preferable.

The linear or branched alkoxy group having 1 to 18 carbon atoms represented by $R_5$ in formula (2) is a substituent in which a linear or branched alkyl group having 1 to 18 carbon atoms and an oxygen atom are bonded together. Specific examples of the alkoxy group include a methoxy group, an ethoxy group, a n-propyloxy group, an iso-propyloxy group, a n-butyloxy group, an iso-butyloxy group, a t-butyloxy group, a n-pentyloxy group, an iso-pentyloxy group, a neo-pentyloxy group, a t-pentyloxy group, a n-hexyloxy group, a n-heptyloxy group, a n-nonyloxy group, a n-decyloxy group, a n-undecyloxy group, and a n-dodecyloxy group. A linear or branched alkoxy group having 6 to 12 carbon atoms, such as a n-hexyloxy group, a n-heptyloxy group, a n-octyloxy group, or a n-dodecyloxy group is preferable, and a linear or branched alkoxy group having 6 to 10 carbon atoms is more preferable.

Specific examples of the linear or branched alkyl group having 1 to 18 carbon atoms represented by $R_6$ in formula (2) include a methyl group, an ethyl group, a n-butyl group, an iso-butyl group, a sec-butyl group, a t-butyl group, a n-pentyl group, an iso-pentyl group, a neo-pentyl group, a t-pentyl group, a hexyl group, a heptyl group, an octyl group, a nonyl group, a n-decyl group, a n-undecyl group, and a n-dodecyl group. A linear or branched alkyl group having 4 to 10 carbon atoms, such as a n-butyl group, a t-butyl group, a n-heptyl group, or a n-decyl group is preferable.

The linear or branched alkoxy group having 1 to 18 carbon atoms represented by $R_6$ in formula (2) is a substituent in which a linear or branched alkyl group having 1 to 18 carbon atoms and an oxygen atom are bonded together. Specific examples of the alkyl group (i.e., the alkyl group in the alkoxy group) include groups that are the same as the specific examples of the linear or branched alkyl group having 1 to 18 carbon atoms represented by $R_6$ in formula (2). A linear or branched alkoxy group having 4 to 10 carbon atoms, such as a n-butloxy group, an iso-butyloxy group, a t-butyloxy group, a n-pentyloxy group, an iso-pentyloxy group, a neo-pentyloxy group, a t-pentyloxy group, a n-hexyloxy group, a n-heptyloxy group, a n-nonyloxy group, or a n-decyloxy group is preferable.

In the composition of the present invention, a plurality of anthraquinone compounds encompassed within the definition of formula (2) may be used in combination.

The composition of the present invention contains a dye compound other than the anthraquinone compound represented by formula (1) or the anthraquinone compound represented by formula (2). The dye compound other than the anthraquinone compound represented by formula (1) or the anthraquinone compound represented by formula (2) is used for making the light control element have a desired hue (preferably black).

The dye compound other than the anthraquinone compound represented by formula (1) or the anthraquinone compound represented by formula (2) is not particularly limited, but a dye compound having a maximum absorption wavelength in the range of 420 to 460 nm is preferable, and a dichroic dye having a maximum absorption wavelength in the range of 420 to 460 nm is more preferable, Examples of a suitable backbone which can be possessed by the dye compound other than the anthraquinone compound represented by formula (1) or the anthraquinone compound represented by general formula (2) include an anthraquinone-based compound (i.e., a compound having an anthraquinone backbone: hereinafter, the wording "-based compound" shall represent a similar meaning), an azo-based compound, a quinophthalone-based compound, a perylene-based compound, a coumarin-based compound, and a naphthalimide-based compound. Among them, an anthraquinone-based compound, an azo-based compound, or a quinophthalone-based compound is preferable.

In the composition of the present invention, a plurality of dye compounds other than the anthraquinone compound represented by formula (1) or the anthraquinone compound represented by formula (2) may be used in combination.

In the composition of the present invention, the total percentage of the anthraquinone compound represented by formula (1) and the anthraquinone compound represented by formula (2) in the dye compounds (A) is preferably 50 mass % or more.

In addition, the content ratio (mass ratio) between the anthraquinone compound represented by formula (1) and the anthraquinone compound represented by formula (2) in the composition of the present invention is from 2:1 to 1:2. When the content ratio between the compound of formula (1) and the compound of formula (2) is controlled in the above-mentioned range, in the light control element described later, it is possible to obtain an effect of sufficient coloring during no voltage application and an effect of eliminating a color residue in the red wavelength range during voltage application.

Incidentally, the content of the dye compound other than the anthraquinone compound represented by formula (1) or the anthraquinone compound represented by formula (2) in the composition of the present invention cannot be determined unconditionally because a purpose of adding such a dye compound is to adjust the hue of the light control element; however, the content is preferably about 4 to 60 mass %, and more preferably about 10 to 30 mass % with respect to the total of the anthraquinone compound represented by formula (1) and the anthraquinone compound represented by formula (2).

The compound represented by formula (1) and the compound represented by formula (2) can be synthesized by conventionally known methods, for example, those described in JPS62-005941A, JP2017-518413A, JPS58-196260A, etc.

Suitable specific examples of the anthraquinone compound represented by formula (1) are shown in Tables 1 and 2 as follows.

In the reference to an alkyl group or an alkoxy group in the tables, "t" refers to an abbreviation for a "tertiary" group, and a group to which "t" is not attached refers to a "normal" group.

TABLE 1

Specific examples of compound represented by formula (1)

| No | X | Y | $R_1$ | $Z_1$ | $R_7$ | $R_8$ | $R_2$ | $R_3$ | $R_4$ |
|---|---|---|---|---|---|---|---|---|---|
| 1 | OH | $NH_2$ | fml.(a) | O | fml.(b) | $C_4H_9$ | H | $C_4H_9$ | fml.(b) |
| 2 | OH | $NH_2$ | fml.(a) | O | $OC_7H_{15}$ | — | H | $C_7H_{15}$ | $OC_7H_{15}$ |
| 3 | OH | $NH_2$ | fml.(a) | O | $C_{12}H_{25}$ | — | H | $C_7H_{15}$ | $C_{12}H_{25}$ |
| 4 | OH | $NH_2$ | fml.(a) | O | fml.(b) | $C_4H_9$ | H | $C_7H_{15}$ | fml.(b) |
| 5 | OH | $NH_2$ | fml.(a) | O | fml.(b) | $C_7H_{15}$ | H | H | fml.(b) |
| 6 | OH | $NH_2$ | fml.(a) | O | fml.(b) | $C_7H_{15}$ | H | $C_7H_{15}$ | fml.(b) |
| 7 | OH | $NH_2$ | fml.(a) | O | fml.(b) | $C_7H_{15}$ | H | $tC_4H_9$ | fml.(b) |
| 8 | OH | $NH_2$ | fml.(a) | O | $OC_7H_{15}$ | — | H | $C_{12}H_{25}$ | $OC_7H_{15}$ |
| 9 | OH | $NH_2$ | fml.(a) | O | $C_{12}H_{25}$ | — | H | $C_{12}H_{25}$ | $C_{12}H_{25}$ |
| 10 | OH | $NH_2$ | fml.(a) | O | $OC_{12}H_{25}$ | — | H | $C_7H_{15}$ | $OC_{12}H_{25}$ |
| 11 | OH | $NH_2$ | fml.(a) | O | $OC_{12}H_{25}$ | — | H | H | $OC_{12}H_{25}$ |
| 12 | OH | $NH_2$ | fml.(a) | O | $OC_{10}H_{21}$ | — | H | $C_{10}H_{21}$ | $OC_{10}H_{21}$ |
| 13 | OH | $NH_2$ | fml.(a) | O | $OC_7H_{15}$ | — | H | $C_4H_9$ | $OC_7H_{15}$ |
| 14 | OH | $NH_2$ | fml.(a) | O | fml.(b) | $C_5H_{11}$ | H | $C_4H_9$ | fml.(b) |
| 15 | OH | $NH_2$ | fml.(a) | O | fml.(b) | $C_3H_7$ | H | $C_4H_9$ | fml.(b) |
| 16 | OH | $NH_2$ | fml.(a) | O | $OC_7H_{15}$ | — | H | $C_4H_9$ | $OC_7H_{15}$ |
| 17 | OH | $NH_2$ | fml.(a) | O | $OC_5H_{11}$ | — | H | $C_4H_9$ | $OC_5H_{11}$ |
| 18 | OH | $NH_2$ | fml.(a) | O | $OC_7H_{15}$ | — | H | $tC_4H_9$ | $OC_7H_{15}$ |
| 19 | OH | $NH_2$ | fml.(a) | O | $OC_8H_{17}$ | — | H | $C_7H_{15}$ | $OC_8H_{17}$ |

TABLE 1-continued

Specific examples of compound represented by formula (1)

| No | X | Y | $R_1$ | $Z_1$ | $R_7$ | $R_8$ | $R_2$ | $R_3$ | $R_4$ |
|---|---|---|---|---|---|---|---|---|---|
| 20 | OH | $NH_2$ | fml.(a) | O | $C_7H_{15}$ | — | H | $C_4H_9$ | $C_7H_{15}$ |
| 21 | OH | $NH_2$ | fml.(a) | O | $OC_7H_{15}$ | — | H | H | $OC_7H_{15}$ |
| 22 | OH | $NH_2$ | fml.(a) | O | fml.(b) | $C_5H_{11}$ | H | $C_4H_9$ | fml.(b) |
| 23 | OH | $NH_2$ | fml.(a) | O | fml.(b) | $C_7H_{15}$ | H | $C_4H_9$ | fml.(b) |
| 24 | OH | $NH_2$ | fml.(a) | O | $OC_8H_{17}$ | — | H | $C_7H_{15}$ | $OC_8H_{17}$ |
| 25 | OH | $NH_2$ | fml.(a) | O | $OC_8H_{17}$ | — | H | $C_4H_9$ | $OC_8H_{17}$ |
| 26 | OH | $NH_2$ | fml.(a) | O | $OC_7H_{15}$ | — | H | $C_2H_5$ | $OC_7H_{15}$ |
| 27 | OH | $NH_2$ | fml.(a) | O | fml.(b) | $C_4H_9$ | H | $C_2H_5$ | fml.(b) |
| 28 | OH | $NH_2$ | fml.(a) | O | fml.(b) | $C_4H_9$ | H | H | fml.(b) |
| 29 | OH | $NH_2$ | fml.(a) | O | fml.(b) | $C_5H_{11}$ | H | H | $OC_7H_{15}$ |

TABLE 2

Specific examples of compound represented by formula (1)

| No | X | Y | $R_1$ | $Z_1$ | $R_7$ | $R_8$ | $R_2$ | $R_3$ | $R_4$ |
|---|---|---|---|---|---|---|---|---|---|
| 30 | OH | $NH_2$ | fml.(a) | S | fml.(b) | $C_4H_9$ | H | $C_4H_9$ | fml.(b) |
| 31 | OH | $NH_2$ | fml.(a) | S | $OC_7H_{15}$ | — | H | $C_7H_{15}$ | $OC_7H_{15}$ |
| 32 | ON | $NH_2$ | fml.(a) | S | $C_{12}H_{25}$ | — | H | $C_7H_{15}$ | $C_{12}H_{25}$ |
| 33 | OH | $NH_2$ | fml.(a) | S | fml.(b) | $C_4H_9$ | H | $C_7H_{15}$ | fml.(b) |
| 34 | OH | $NH_2$ | fml.(a) | S | fml.(b) | $C_7H_{15}$ | H | H | fml.(b) |
| 35 | OH | $NH_2$ | fml.(a) | S | fml.(b) | $C_7H_{15}$ | H | $C_7H_{15}$ | fml.(b) |
| 36 | OH | $NH_2$ | fml.(a) | S | fml.(b) | $C_7H_{15}$ | H | $C_4H_9$ | fml.(b) |
| 37 | OH | $NH_2$ | fml.(a) | S | $OC_7H_{15}$ | — | H | $C_{12}H_{25}$ | $OC_7H_{15}$ |
| 38 | OH | $NH_2$ | fml.(a) | S | $C_{12}H_{25}$ | — | H | $C_{12}H_{25}$ | $C_{12}H_{25}$ |
| 39 | OH | $NH_2$ | fml.(a) | S | $OC_{12}H_{25}$ | — | H | $C_7H_{15}$ | $OC_{12}H_{25}$ |
| 40 | OH | $NH_2$ | fml.(a) | S | $OC_{12}H_{25}$ | — | H | H | $OC_{12}H_{25}$ |
| 41 | OH | $NH_2$ | fml.(a) | S | $OC_{10}H_{21}$ | — | H | $C_{10}H_{21}$ | $OC_{10}H_{21}$ |
| 42 | OH | $NH_2$ | fml.(a) | S | $OC_7H_{15}$ | — | H | $C_4H_9$ | $OC_7H_{15}$ |
| 43 | OH | $NH_2$ | fml.(a) | S | fml.(b) | $C_5H_{11}$ | H | $C_4H_9$ | fml.(b) |
| 44 | OH | $NH_2$ | fml.(a) | S | fml.(b) | $C_3H_7$ | H | $C_4H_9$ | fml.(b) |
| 45 | OH | $NH_2$ | fml.(a) | S | $OC_7H_{15}$ | — | H | $C_4H_9$ | $OC_2H_{15}$ |
| 46 | OH | $NH_2$ | fml.(a) | S | $OC_5H_{11}$ | — | H | $C_4H_9$ | $OC_2H_{15}$ |
| 47 | OH | $NH_2$ | fml.(a) | S | $OC_5H_{11}$ | — | H | $tC_4H_9$ | $OC_2H_{15}$ |
| 48 | OH | $NH_2$ | fml.(a) | S | $OC_8H_{17}$ | — | H | $C_7H_{15}$ | $OC_8H_{17}$ |
| 49 | OH | $NH_2$ | fml.(a) | S | $C_7H_{15}$ | — | H | $C_4H_9$ | $C_7H_{15}$ |
| 50 | OH | $NH_2$ | fml.(a) | S | $OC_7H_{15}$ | — | H | H | $OC_7H_{15}$ |
| 51 | OH | $NH_2$ | fml.(a) | S | fml.(b) | $C_5H_{11}$ | H | $C_4H_9$ | fml.(b) |
| 52 | OH | $NH_2$ | fml.(a) | S | fml.(b) | $C_7H_{15}$ | H | $C_4H_9$ | fml.(b) |
| 53 | OH | $NH_2$ | fml.(a) | S | $OC_8H_{17}$ | — | H | $C_7H_{15}$ | $OC_8H_{17}$ |
| 54 | OH | $NH_2$ | fml.(a) | S | $OC_8H_{17}$ | — | H | $C_4H_9$ | $OC_8H_{17}$ |
| 55 | OH | $NH_2$ | fml.(a) | S | $OC_7H_{15}$ | — | H | $C_2H_5$ | $OC_2H_{15}$ |
| 56 | OH | $NH_2$ | fml.(a) | S | fml.(b) | $C_4H_9$ | H | $C_2H_5$ | fml.(b) |
| 57 | OH | $NH_2$ | fml.(a) | S | fml.(b) | $C_4H_9$ | H | H | fml.(b) |
| 58 | OH | $NH_2$ | fml.(a) | S | fml.(b) | $C_5H_{11}$ | H | H | $OC_2H_{15}$ |

Suitable specific examples of the anthraquinone compound represented by formula (2) are shown in Table 3.

TABLE 3

Specific examples of compound represented by formula (2)

| No | $R_5$ | $R_6$ |
|---|---|---|
| 101 | $t-C_4H_9$ | $C_7H_{15}$ |
| 102 | $t-C_4H_9$ | $C_{10}H_{21}$ |
| 103 | $t-C_4H_9$ | $C_4H_9$ |
| 104 | $C_7H_{15}$ | $C_{10}H_{21}$ |
| 105 | $C_7H_{15}$ | $C_7H_{15}$ |
| 106 | $C_7H_{15}$ | $C_4H_9$ |
| 107 | $t-C_4H_9$ | $OC_7H_{15}$ |
| 108 | $t-C_4H_9$ | $OC_4H_9$ |
| 109 | $OC_7H_{15}$ | $C_4H_9$ |
| 110 | $OC_7H_{15}$ | $C_{10}H_{21}$ |
| 111 | $CH_3$ | $C_4H_9$ |
| 112 | $CH_3$ | $C_7H_{15}$ |
| 113 | $CH_3$ | $C_{10}H_{21}$ |

Suitable specific examples of the dye compound other than the anthraquinone compound represented by formula (1) or the anthraquinone compound represented by formula (2) include the following compounds represented by formulae (3) to (6).

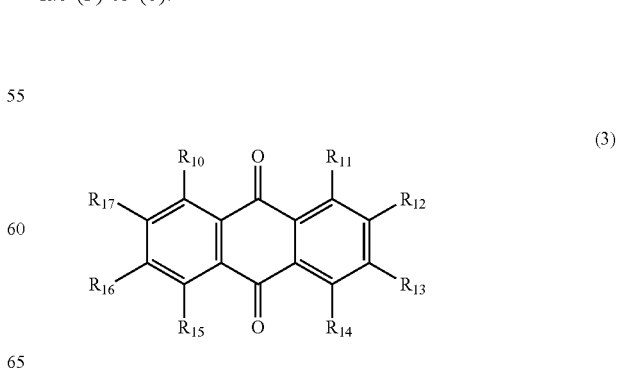

(3)

TABLE 4
Specific examples of compound represented by formula (3)
| No | $R_{10}$ | $R_{11}$ | $R_{12}$ | $R_{13}$ | $R_{14}$ | $R_{15}$ | $R_{16}$ | $R_{17}$ |
|---|---|---|---|---|---|---|---|---|
| 201 | H | OH | 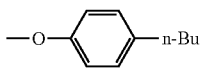 | H | OH | H | H | H |
| 202 | H | OH | 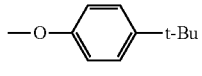 | H | OH | H | H | H |
| 203 | H | OH | 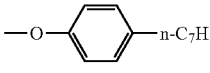 | H | OH | H | H | H |
| 204 | H | OH | 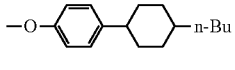 | H | OH | H | H | H |
| 205 | H | 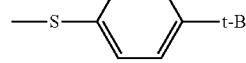 | H | H | H | 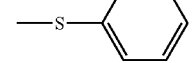 | H | H |
| 206 | H | 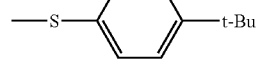 | H | H | H | 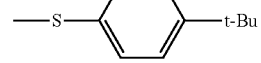 | H | H |
| 207 | H | 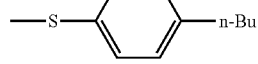 | H | H | H | 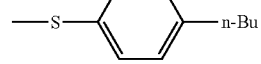 | H | H |
| 208 | H | 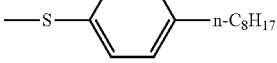 | H | H | H | 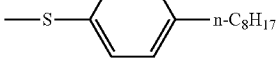 | H | H |
| 209 | H | 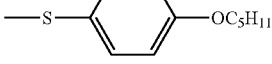 | H | H | H |  | H | H |
| 210 | H | 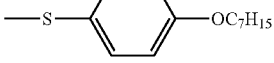 | H | H | H | 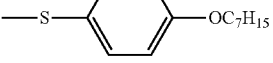 | H | H |
| 211 | H | 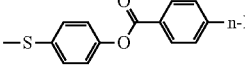 | H | H | H | 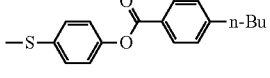 | H | H |
| 212 | H | 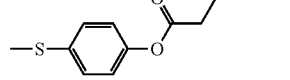 | H | H | H | 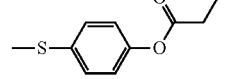 | H | H |
| 213 | H | 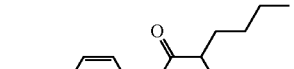 | H | H | H | 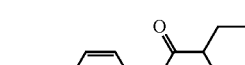 | H | H |
| 214 | H |  | H | H | H | 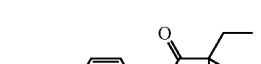 | H | H |

TABLE 5

Specific examples of compound represented by formula (3)

| No | $R_{10}$ | $R_{11}$ | $R_{12}$ | $R_{13}$ | $R_{14}$ | $R_{15}$ | $R_{16}$ | $R_{17}$ |
|---|---|---|---|---|---|---|---|---|
| 215 | H | 4-(2-hexyloctanoyloxy)phenylthio- | H | H | H | 4-(2-hexyloctanoyloxy)phenylthio- | H | H |
| 216 | H | 4-(2,4,4-trimethyl-2-isopropylpentanoyloxy)phenylthio- | H | H | H | 4-(2,4,4-trimethyl-2-isopropylpentanoyloxy)phenylthio- | H | H |
| 217 | H | 4-(4-n-butylcyclohexyl)phenylthio- | H | H | H | 4-(4-n-butylcyclohexyl)phenylthio- | H | H |
| 218 | H | 4-(4-n-C$_5$H$_{11}$-cyclohexyl)phenylthio- | H | H | H | 4-(4-n-C$_5$H$_{11}$-cyclohexyl)phenylthio- | H | H |
| 219 | H | 4-t-Bu-phenylthio- | H | H | H | H | 4-(OC$_7$H$_{15}$)phenyl acetoxy- | H |
| 220 | H | 4-t-Bu-phenylthio- | H | H | H | H | 4-(OC$_7$H$_{15}$)phenyl acetoxy- | H |
| 221 | H | 4-t-Bu-phenylthio- | H | H | H | H | 4-(n-Bu)phenyl acetoxy- | H |

TABLE 5-continued

Specific examples of compound represented by formula (3)

| No | R10 | R11 | R12 | R13 | R14 | R15 | R16 | R17 |
|---|---|---|---|---|---|---|---|---|
| 222 | H | —S—C6H4—t-Bu (4-t-Bu-phenylthio) | H | H | H | H | H | 4-n-Bu-phenyl acetate |

$$A_1-N=N-A_2 \qquad (4)$$

TABLE 6

Specific examples of compound represented by formula (4)

| No | $A_1$ | $A_2$ |
|---|---|---|
| 301 | 4-methylphenyl-C(=O)O-n-Bu | 4-methylphenyl-N(n-Bu)(n-Bu) |
| 302 | 4-methylphenyl-C(=O)O-n-C$_7$H$_{15}$ | 4-methylphenyl-N(n-Bu)(n-Bu) |
| 303 | 4-methylphenyl-C(=O)O-n-Bu | 4-methylphenyl-N(n-C$_7$H$_{15}$)(n-C$_7$H$_{15}$) |
| 304 | 4-methylphenyl-C(=O)O-CH(C$_2$H$_5$)(n-C$_4$H$_9$) | 4-methylphenyl-N(n-Bu)(n-Bu) |
| 305 | 4-methylphenyl-phenyl-n-Bu | 4-methylphenyl-N=N-OC$_3$H$_7$ |
| 306 | 4-methylphenyl-phenyl-C$_8$H$_{17}$ | 4-methyl-naphthyl-N=N-phenyl-OCH$_2$-phenyl-OC$_7$H$_{15}$ |
| 307 | 4-methylphenyl-phenyl-n-Bu | 4-methyl-naphthyl-N=N-phenyl-OC$_2$H$_5$ |
| 308 | 4-methylphenyl-N=CH-phenyl-OC$_4$H$_9$ | 4-methyl-naphthyl-N=CH-phenyl-OC$_4$H$_9$ |
| 309 | 4-methylphenyl | 4-methyl-naphthyl-N=N-phenyl-O-C(=O)-phenyl-OC$_3$H$_7$ |
| 310 | 4-methylphenyl-phenyl-n-Bu | 4-methyl-naphthyl-N=N-phenyl-O-C(=O)-phenyl-OC$_8$H$_{13}$ |

TABLE 6-continued

Specific examples of compound represented by formula (4)

| No | A₁ | A₂ |
|---|---|---|
| 311 | 4-methylphenyl-cyclohexyl-C₃H₇ | 4-methylnaphthyl-N=N-phenyl-O-C(=O)-phenyl-OC₄H₉ |

TABLE 7

Specific examples of compound represented by formula (4)

| No | A₁ | A₂ |
|---|---|---|
| 312 | 4-methylbiphenyl-C₅H₁₁ | 4-methylnaphthyl-N=N-phenyl-O-C(=O)-phenyl-OC₄H₉ |
| 313 | 4-methylphenyl-Me | 4-methylphenyl-N=N-naphthyl-O-C(=O)-phenyl-OC₄H₉ |
| 314 | 4-methylphenyl-n-Bu | 4-methylphenyl-N=N-naphthyl-O-C(=O)-phenyl-OC₄H₉ |
| 315 | 4-methylphenyl-cyclohexyl-C₃H₇ | 4-methylphenyl-N=N-naphthyl-O-C(=O)-phenyl-OC₄H₉ |

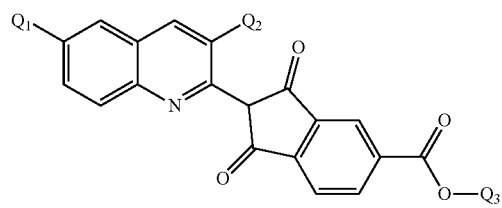

(5)

TABLE 8
Specific examples of compound represented by formula (5)
| No | Q₁ | Q₂ | Q₃ |
|---|---|---|---|
| 401 | H | OH | 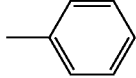 |
| 402 | H | OH | 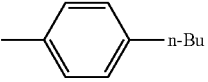 |
| 403 | H | OH | 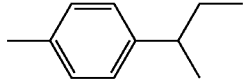 |
| 404 | H | OH | 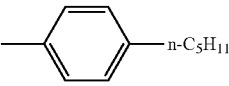 |
| 405 | H | OH | 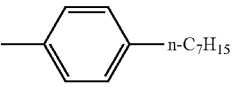 |
| 406 | H | OH | 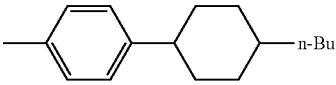 |
| 407 | H | OH | 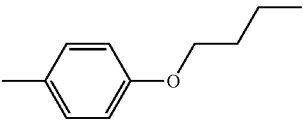 |
| 408 | H | OH | 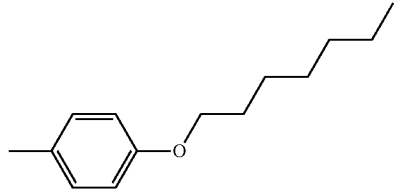 |
| 409 | n-Bu | H | n-Bu |
| 410 | n-C₇H₁₅ | H | n-C₇H₁₅ |
| 411 | 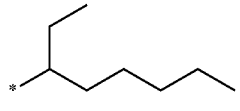 [SMILES: *C(CC)CCCCC] | H | 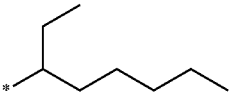 [SMILES: *C(CC)CCCCC] |
| 412 | 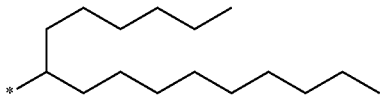 [SMILES: *C(CCCCCC)CCCCCCCCC] | H | 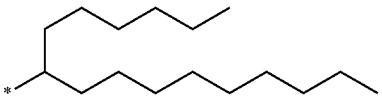 [SMILES: *C(CCCCCC)CCCCCCCCC] |
| 413 | 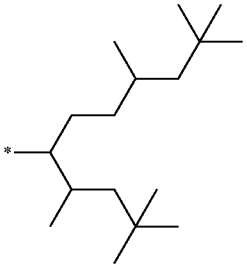 [SMILES: *C(CCC(C)CC(C)(C)C)C(C)CC(C)(C)C] | H | 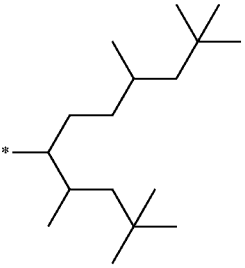 [SMILES: *C(CCC(C)CC(C)(C)C)C(C)CC(C)(C)C] |

TABLE 9

Specific examples of compound represented by formula (5)

| No | Q₁ | Q₂ | Q₃ |
|---|---|---|---|
| 414 | n-Bu | OH | n-Bu |
| 415 | n-C7H15 | OH | n-C7H15 |
| 416 | | OH | |
| 417 | | OH | |

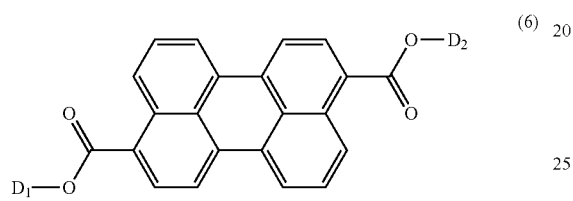

(6)

TABLE 10

Specific examples of compound represented by formula (6)

| No | D₁ | D₂ |
|---|---|---|
| 501 | –C₆H₄–n-Bu | –C₆H₄–n-Bu |
| 502 | –C₆H₄–t-Bu | –C₆H₄–t-Bu |
| 503 | –C₆H₄–n-C₈H₁₇ | –C₆H₄–n-C₈H₁₇ |
| 504 | –C₆H₁₀–n-C₅H₁₁ | –C₆H₁₀–n-C₅H₁₁ |
| 505 | –C₆H₄–O–C(=O)–C₅H₁₁ | –C₆H₄–O–C(=O)–C₅H₁₁ |
| 506 | –C₆H₄–O–C(=O)–CH(C₂H₅)–C₄H₉ | –C₆H₄–O–C(=O)–CH(C₂H₅)–C₄H₉ |
| 507 | –C₆H₄–O–C(=O)–CH(C₆H₁₃)–C₇H₁₅ | –C₆H₄–O–C(=O)–CH(C₆H₁₃)–C₇H₁₅ |

TABLE 10-continued

Specific examples of compound represented by formula (6)

| No | D₁ | D₂ |
|---|---|---|
| 508 | [structure] | [structure] |
| 509 | [structure] | [structure] |
| 510 | [structure] | [structure] |
| 511 | H | —S—[phenyl]—[cyclohexyl]—n-C₅H₁₁ |
| 512 | H | —S—[phenyl]—t-Bu |

The liquid crystal material (B) contained in the liquid crystal composition of the present invention is not particularly limited as long as it is a material having liquid crystallinity (compound having liquid crystallinity), such as nematic liquid crystal, cholesteric liquid crystal, or smectic liquid crystal, and among them, nematic liquid crystal is preferable. Examples of the liquid crystal compound include the liquid crystal compounds described in pages 154 to 192 and pages 715 to 722 of "Liquid Crystal Device Handbook" (edited by the 142nd Committee of Japan Society for the Promotion of Science, The Nikkan Kogyo Shimbun, Ltd., 1989).

In a liquid crystal composition obtained by adding the dye compounds (A) to all components of the liquid crystal composition other than the dye compounds, stirring the mixture at 40 to 50° C. for 1 hour, and then filtering the mixture, when the total solubility of the dye compounds (A) contained in the liquid crystal composition is defined as the concentration of the dye compounds (A) with respect to all components of the liquid crystal composition other than the dye compounds (A), the concentration is preferably 0.5 to 10 mass %, and more preferably 1 to 6 mass %. When the solubility of the dye compounds (A) is set in the above-mentioned range, a sufficient effect of adding the dyes can be obtained, and a satisfactory black element can be obtained. Furthermore, also in the case of adding the photocurable compound (C) and the photopolymerization initiator (D) and obtaining a cured product by light irradiation, when the solubility of the dye compounds (A) is set in the above-mentioned range, curability is improved without inhibition of polymerization of the photocurable compound (C).

The photocurable compound (C) contained in the liquid crystal composition of the present invention is not particularly limited as long as it is a compound having a functional group that is polymerizable by the action of a photopolymerization initiator described later when irradiated with light. It is preferable to use, as the photocurable compound, both of a monofunctional monomer having one polymerizable functional group and a bifunctional monomer having two polymerizable functional groups in combination.

The monofunctional monomer in the photocurable compound used in the liquid crystal composition of the present invention has compatibility with the liquid crystal in the liquid crystal composition before light irradiation, and forms a cured product phase by phase separation from the liquid crystal when polymerized by light irradiation to play a role of reducing interface interaction with the liquid crystal phase. Therefore, when the monofunctional monomer has an excessively high polarity, the interface interaction with the liquid crystal phase becomes too strong to inhibit the movement of the liquid crystal, and a high driving voltage is required. Accordingly, the monofunctional monomer preferably has a low polarity.

The bifunctional monomer in the photocurable compound used in the liquid crystal composition of the present invention forms a cured product phase by phase separation from the liquid crystal when polymerized by light irradiation to play a role of stabilizing a separated state from the liquid crystal phase. Therefore, when the bifunctional monomer has an excessively high polarity, the interface interaction with the liquid crystal phase becomes too strong to inhibit the movement of the liquid crystal, and a high driving voltage is required. Accordingly, the bifunctional monomer also preferably has a low polarity.

Examples of the compound having a functional group that is polymerizable by the action of the photopolymerization initiator include a compound having a (meth)actylate group, a compound having a vinyl group, and a compound having an allyl group. A compound having a (meth)acrylate group is preferable. That is, it is more preferable to use both the mono(meth)acrylate compound having one (meth)acrylate group in one molecule and the di(meth)acrylate compound having two (meth)acrylate groups in one molecule in combination.

In the present description, the term "(meth)acrylate" means "methacrylate and/or acrylate".

The mono(meth)acrylate compound is preferably a mono (meth)acrylate having a linear, cyclic, or branched alkyl group having 5 to 13 carbon atoms. Specific examples thereof include linear alkyl mono(meth)acrylates such as pentyl (meth)acrylate, hexyl (meth)acrylate, heptyl (meth) acrylate, octyl (meth)acrylate, nonyl (meth)acrylate, decyl (meth)acrylate, undecyl (meth)acrylate, dodecyl (meth) acrylate, and tridecyl (meth)acrylate; cyclic alkyl mono (meth)acrylates such as isobornyl (meth)acrylate; and branched alkyl mono(meth)acrylates such as 2-methylhexyl (meth)acrylate, 2-ethylhexyl (meth)acrylate, 2-propylhexyl (meth)acrylate, 2-methylheptyl (meth)acrylate, 2-ethylheptyl (meth)acrylate, and 2-propylheptyl (meth)acrylate.

As the di(meth)acrylate compound, for example, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,12-dodecanediol di(meth)actylate, and 1,13-tridecanediol di(meth)acrylate, and trialkylene glycol di(meth)acrylates such as triethylene glycol di(meth)acrylate are suitably used.

When the monofunctional monomer and the bifunctional monomer are used in combination, the mass ratio of the monofunctional monomer to the bifunctional monomer is preferably from 10:90 to 97:3, and more preferably from 50:50 to 96:4. When the amount of the used monofunctional monomer is in the above-mentioned range of the ratio, the compatibility with the liquid crystal does not become too high, so that separation of the polymer (polymer phase) formed by light irradiation from the liquid crystal phase occurs moderately and it is possible to prevent gelation of only the monomer, and moreover, it is easy to form the polymer phase and the liquid crystal phase which are separated from each other.

The compatibility between the photocurable compound (C) and the liquid crystal material (B) used in the liquid crystal composition of the present invention can be evaluated by once compatibilizing the photocurable compound (C) with the liquid crystal material (B) and then visually observing phase separation accompanying a decrease in temperature with a polarizing microscope, or can be evaluated according to the phase separation temperature obtained by measurement such as DSC. The phase separation temperature between the photocurable compound (C) and the liquid crystal material (B) is preferably in the range of 0 to 50° C., and more preferably in the range of 10 to 40° C. When the phase separation temperature is in the above-mentioned range, satisfactory compatibility is established between the photocurable compound (C) and the liquid crystal material (B) in the liquid crystal composition, and phase separation does not occur after polymerization of the photocurable compound (C) proceeds by light irradiation. Therefore, the liquid crystal phase formed as a result is not excessively small and the driving voltage can be lowered, and furthermore, it becomes easy to maintain the compatibilized state of the components until light irradiation is performed.

The photopolymerization initiator (D) contained in the liquid crystal composition of the present invention is not particularly limited as long as it is a compound capable of polymerizing a photocurable compound by light irradiation. It is preferable that the photopolymerization initiator (D) does not remain in the cured product of the liquid crystal composition after light irradiation so that it may not cause deterioration of the dichroic dye or the like.

As the photopolymerization initiator, for example, alkylphenone-based photopolymerization initiators such as Darocure 1173, Irgacure 651, and Irgacure 184, and phosphine oxide-based photopolymerization initiators such as Irgacure TPO are preferably used.

The content of the dye compounds (A) in the liquid crystal composition of the present invention is preferably 1 to 6 parts by mass with respect to 100 parts by mass of the liquid crystal material (B). In addition, the blending ratio of the sum of the dye compounds (A) and the liquid crystal material (B) to the photocurable compound (C) is preferably from 90:10 to 50:50, and more preferably from 80:20 to 50:50 in mass ratio. When the blending ratio of the photocurable compound (C) is set in the above-mentioned range, it is possible to prevent separation between the liquid crystal material (B) and the photocurable compound (C) before curing by light irradiation and deterioration of the light shielding property of the cured product.

The content of the photopolymerization initiator (D) is preferably about 0.1 to 5 parts by mass with respect to 100 parts by mass of the photocurable compound (C).

In the liquid crystal composition of the present invention, in addition to the dye compounds (A) to the photopolymerization initiator (D), for example, the following compounds may be used in combination: a light stabilizer such as a benzotriazole-based light stabilizer, a. benzophenone-based light stabilizer, or a hindered amine-based light stabilizer, an antioxidant such as a phosphite-based antioxidant or a hindered phenol-based antioxidant, a thermal polymerization inhibitor, a thiol compound, a photosensitizing agent, a photosensitizer, a chain transfer inhibitor, a polymerization inhibitor, an adhesiveness imparting agent, an antifoaming agent, a crosslinking agent, a surfactant, a thermosetting accelerator, a thermoplastic resin, a thermosetting resin, a thickener such as urethane diacrylate, or the like. In addition, in order to control the cell gap in the light control element, a spherical or cylindrical spacer made of silica, glass, plastics, or ceramics may be added to the liquid crystal composition. The cell gap in this case can be set in a range of 2 to 100 μm.

The liquid crystal composition of the present invention is obtained by mixing and stirring the dye compounds (A) and the liquid crystal material (B), which are essential components, and optional components added as necessary Most simply, mixing and stirring may be performed by placing all the components in a container and manually stirring them, but it is effective to perform stirring using a device such as a magnetic stirrer.

Irradiation of the liquid crystal composition of the present invention with light provides a cured product of the liquid crystal composition containing the cured (polymerized) photocurable compound (C). The "cured product" in the present invention means a state in which the functional group of the photocurable compound is polymerized or copolymerized by light irradiation, and does not necessarily mean a cured product in which the dye compounds (A), the liquid crystal material (B), and the like have contributed to the curing reaction.

The light source used in the light irradiation is not particularly limited as long as the light source can emit light having a wavelength absorbed by the photopolymerization initiator (D). Preferable examples of the light source include a high-pressure mercury lamp, a metal halide lamp, a xenon lamp, and a halogen lamp that are capable of emitting ultraviolet rays.

The temperature used in the light irradiation is preferably a temperature at which the liquid crystal composition can maintain a uniformly compatibilized state, that is, a temperature higher than the phase separation temperature, and the temperature is more preferably maintained at a temperature that is higher than the phase separation temperature by 1 to 5° C. When the temperature used in the light irradiation is higher than the phase separation temperature, the photocurable compound and the liquid crystal material are prevented from being separated before light irradiation, and a more uniform cured product can be obtained. Meanwhile, when the temperature used in the light irradiation is not so significantly higher than the phase separation temperature, at the time the polymerized product of the photocurable compound obtained by photocuring and the liquid crystal material are separated from each other, the size of the domain formed by the liquid crystal material is prevented from becoming excessively small.

The light control element of the present invention includes a pair of substrates that are arranged to face each other, in which at least one is a transparent substrate having a transparent electrode, and a thin film layer of the liquid crystal composition of the present invention or the cured product of the liquid crystal composition of the present invention, which is sandwiched between the substrates. Here, examples of the material of the substrate include glass, quartz, metals, metal oxides, semiconductors, ceramics, and organic polymer materials. A composite material obtained by combining these materials with a filler, reinforcing fibers, or the like may be used, and the shape of the substrate may be a plate shape or a film shape.

The electrode is a conductive thin film provided on the entire surface or a part of the substrate by, for example, a coating method, a printing method, vapor deposition such as sputtering, or the like using a metal oxide, a metal, a semiconductor, an organic conductive substance, or the like. The electrode provided on the substrate can be partially etched. In terms of efficiently producing a light control element having a large area, it is preferable to use an electrode substrate that is a transparent polymer film made from PET or the like and having an ITO (indium oxide, tin oxide) electrode formed thereon using a vapor deposition method such as sputtering, a printing method, or the like.

Wiring may be provided on the substrate to connect the electrodes together or connect the electrodes with an external device. For example, a segment driving electrode substrate, a matrix driving electrode substrate, or an active matrix driving electrode substrate may be used. Furthermore, on a surface of the electrode provided on the substrate, a protective film or an alignment film made of an organic compound such as polyimide, polyamide, silicon, or a cyan compound, an inorganic compound such as $SiO_2$, $TiO_2$, air $ZrO_2$, or a mixture thereof may be provided.

In the light control element of the present invention, the hue value $a^*$ obtained according to JIS Z 8781 in the transmittance measurement in a state where a voltage is applied between the pair of substrates may be 5.0 or less. It can be estimated that when such a condition is satisfied, the color residue in the red region is sufficiently reduced. The hue value $a^*$ is more preferably 3.0 or less. The display method of object color defined in JIS Z 8781 corresponds to the display method of object color defined by the International Commission on Illumination (abbreviated name: CIE).

In the light control element of the present invention, when a voltage is applied between the pair of substrates, the difference between the smallest transmittance value and the largest transmittance value among minimum transmittances in a wavelength range of 420 to 460 nm, a wavelength range of 520 to 590 nm, and a wavelength range of 600 to 640 nm may be 6% or less. It can be estimated that when such a condition is satisfied, the color residue in the red region is sufficiently reduced. Further, when no voltage is applied, the difference between the smallest transmittance value and the largest transmittance value among minimum transmittances in a wavelength range of 420 to 460 nm, a wavelength range of 520 to 590 nm, and a wavelength range of 600 to 640 nm may be 6% or less. When such a condition is satisfied, a satisfactory black light control element can be obtained. It is preferable that either one of these conditions is satisfied, and it is more preferable that both of these conditions are satisfied. When both of these conditions are satisfied, it is possible to obtain an excellent black light control element in which the color residue in the red region is sufficiently reduced.

EXAMPLES

Hereinafter, the present invention will be specifically described with reference to examples. The terms "part(s)" and "%" in the text are on a mass basis unless otherwise specified. The maximum absorption wavelength in the examples is a value measured with a spectrophotometer "UV-3150" (manufactured by Shimadzu Corporation).

Example 1 (Preparation of Liquid Crystal Composition of the Present Invention)

On a hot plate at 70° C., 0.362 parts of isobornyl acrylate (manufactured by OSAKA ORGANIC CHEMICAL INDUSTRY LTD.) as a monofunctional monomer of the photocurable compound (C), 0.018 parts of triethylene glycol dimethacrylate (manufactured by SHIN-NAKAMURA CHEMICAL Co., Ltd.) as a bifunctional monomer of the photocurable compound (C), 0.297 parts of 1-cyano-4'-n-pentylbiphenyl, 0.146 parts of 1-cyano-4'-n-heptylbiphenyl, 0.093 parts of 1-cyano-4'-n-octyloxybiphenyl, and 0.047 parts of 1-cyano-4"-n-pentylterphenyl as the liquid crystal material (B), 0.004 parts of Irgacure TPO (manufactured by BASF SE) and 0.004 parts of Irgacure 184 (manufactured by BASF SE) as the photopolymerization initiator (D), and 0.0102 parts of the compound represented by No. 2 in the specific examples, 0.0135 parts of the compound represented by No. 102 in the specific examples, and 0.0063 parts of the compound represented by No. 213 in the specific examples as the dye compounds (A) were stirred for 1 hour to prepare a liquid crystal composition of the present invention (the content of the dye compounds (A) was about 3.0 mass % with respect to the total amount of the photocurable compound (C), the liquid crystal material (B), and the photopolymerization initiator (D), and the content ratio (mass ratio) between No. 2 and No. 102 was 2:2.6).

Example 2 (Preparation of Liquid Crystal Composition of the Present Invention)

A liquid crystal composition of the present invention was prepared in the same manner as in Example 1 except that the dye compounds (A) were changed to 0.0126 parts of the compound represented by No. 2 in the specific examples, 0.0090 parts of the compound represented by No. 102 in the specific examples, and 0.0069 parts of the compound represented by No. 202 in the specific examples (the content of the dye compounds (A) was about 3.0 mass % with respect to the total amount of the photocurable compound (C), the liquid crystal material (B), and the photopolymerization initiator (D), and the content ratio between No. 2 and No. 102 was 2:1.4).

Example 3 (Preparation of Liquid Crystal Composition of the Present Invention)

A liquid crystal composition of the present invention was prepared in the same manner as in Example 1 except that the dye compounds (A) were changed to 0.0093 parts of the compound represented by No. 1 in the specific examples, 0.0122 parts of the compound represented by No. 102 in the specific examples, and 0.0085 parts of the compound represented by No. 215 in the specific examples (the content of the dye compounds (A) was about 3.0 mass % with respect to the total amount of the photocurable compound (C), the liquid crystal material (B), and the photopolymerization initiator (D), and the content ratio between No. 1 and No. 102 was 2:2.6).

Example 4 (Preparation of Liquid Crystal Composition of the Present Invention)

A liquid crystal composition of the present invention was prepared in the same manner as in Example 1 except that the dye compounds (A) were changed to 0.0105 parts of the compound represented by No. 25 in the specific examples. 0.0150 parts of the compound represented by No. 107 in the specific examples, and 0.0045 parts of the compound represented by No. 205 in the specific examples (the content of the dye compounds (A) was about 3.0 mass % with respect to the total amount of the photocurable compound (C), the liquid crystal material (B), and the photopolymerization initiator (D), and the content ratio between No. 25 and No. 107 was 2:2.9).

Example 5 (Preparation of Liquid Crystal Composition of the Present Invention)

A liquid crystal composition of the present invention was prepared in the same manner as in Example 1 except that the dye compounds (A) were changed to 0.0093 parts of the compound represented by No. 19 in the specific examples, 0.0122 parts of the compound represented by No. 101 in the specific examples, and 0.0085 parts of the compound represented by No. 216 in the specific examples (the content of the dye compounds (A) was about 3.0 mass % with respect to the total amount of the photocurable compound (C), the liquid crystal material (B), and the photopolymerization initiator (D), and the content ratio between No. 19 and No. 101 was 2:2.6).

Example 6 (Preparation of Liquid Crystal Composition of the Present Invention)

A liquid crystal composition of the present invention was prepared in the same manner as in Example 1 except that the dye compounds (A) were changed to 0.0102 parts of the compound represented by No. 1 in the specific examples, 0.0135 parts of the compound represented by No. 102 in the specific examples, and 0.0065 parts of the compound represented by No. 213 in the specific examples (the content of the dye compounds (A) was about 3.0 mass % with respect to the total amount of the photocurable compound (C), the liquid crystal material (B), and the photopolymerization initiator (D), and the content ratio between No. 1 and No. 102 was 2:2.6).

Example 7 (Preparation of Liquid Crystal Composition of the Present Invention)

A liquid crystal composition of the present invention was prepared in the same manner as in Example 1 except that the dye compounds (A) were changed to 0.0108 parts of the compound represented by No. 16 in the specific examples, 0.0152 parts of the compound represented by No. 102 in the specific examples, and 0.0039 parts of the compound represented by No. 205 in the specific examples (the content of the dye compounds (A) was about 3.0 mass % with respect to the total amount of the photocurable compound (C), the liquid crystal material (B), and the photopolymerization initiator (D), and the content ratio between No. 16 and No. 102 was 2:2.8).

Example 8 (Preparation of Liquid Crystal Composition of the Present Invention)

A liquid crystal composition of the present invention was prepared in the same manner as in Example 1 except that the dye compounds (A) were changed to 0.0081 parts of the compound represented by No. 18 in the specific examples, 0.0114 parts of the compound represented by No. 101 in the specific examples, and 0.0100 parts of the compound represented by No. 216 in the specific examples (the content of the dye compounds (A) was about 3.0 mass % with respect to the total amount of the photocurable compound (C), the liquid crystal material (B), and the photopolymerization initiator (D), and the content ratio between No. 18 and No. 101 was 2:2.8).

Example 9 (Preparation of Liquid Crystal Composition of the Present Invention)

A liquid crystal composition of the present invention was prepared in the same manner as in Example 1 except that the dye compounds (A) were changed to 0.0105 parts of the compound represented by No. 23 in the specific examples, 0.0115 parts of the compound represented by No. 102 in the specific examples, and 0.0080 parts of the compound represented by No. 215 in the specific examples (the content of the dye compounds (A) was about 3.0 mass % with respect to the total amount of the photocurable compound (C), the liquid crystal material (B), and the photopolymerization initiator (D), and the content ratio between No. 23 and No. 102 was 2:2.2).

Example 10 (Preparation of Liquid Crystal Composition of the Present Invention)

A liquid crystal composition of the present invention was prepared in the same manner as in Example 1 except that the dye compounds (A) were changed to 0.0108 parts of the compound represented by No. 1 in the specific examples, 0.0153 parts of the compound represented by No. 101 in the specific examples, and 0.0039 parts of the compound represented by No. 205 in the specific examples (the content of the dye compounds (A) was about 3.0 mass % with respect to the total amount of the photocurable compound (C), the liquid crystal material (B), and the photopolymerization initiator (D), and the content ratio between No. 1 and No. 101 was 2:2.8).

Example 11 (Preparation of Liquid Crystal Composition of the Present Invention)

A liquid crystal composition of the present invention was prepared in the same manner as in Example 1 except that the dye compounds (A) were changed to 0.0125 parts of the compound represented by No. 19 in the specific examples, 0.0162 parts of the compound represented by No. 101 in the specific examples, and 0.0014 parts of the compound represented by No. 301 in the specific examples (the content of the dye compounds (A) was about 3.0 mass % with respect to the total amount of the photocurable compound (C), the liquid crystal material (B), and the photopolymerization initiator (D), and the content ratio between No. 19 and No. 101 was 2:2.6).

Example 12 (Preparation of Liquid Crystal Composition of the Present Invention)

A liquid crystal composition of the present invention was prepared in the same manner as in Example 1 except that the dye compounds (A) were changed to 0.0102 parts of the compound represented by No. 17 in the specific examples, 0.0171 parts of the compound represented by No. 102 in the specific examples, and 0.0027 parts of the compound represented by No. 412 in the specific examples (the content of the dye compounds (A) was about 3.0 mass % with respect to the total amount of the photocurable compound (C), the liquid crystal material (B), and the photopolymerization initiator (D), and the content ratio between No. 17 and No. 102 was 2:3.4).

Example 13 (Preparation of Liquid Crystal Composition of the Present Invention)

A liquid crystal composition of the present invention was prepared in the same manner as in Example 1 except that the dye compounds (A) were changed to 0.0090 parts of the compound represented by No. 22 in the specific examples, 0.0120 parts of the compound represented by No. 101 in the specific examples, and 0.0090 parts of the compound represented by No. 216 in the specific examples (the content of the dye compounds (A) was about 3.0 mass % with respect to the total amount of the photocurable compound (C), the liquid crystal material (B), and the photopolymerization initiator (D), and the content ratio between No. 22 and No. 101 was 2:2.7).

Comparative Example 1 (Preparation of Comparative Liquid Crystal Composition)

A comparative liquid crystal composition was prepared in the same manner as in Example 1 except that the dye compounds (A) were changed to 0.0135 parts of a compound represented by formula (X), 0.0120 parts of a compound represented by formula (Y), and 0.0045 parts of the compound represented by No. 202 in the specific examples (the content of the dye compounds (A) was about 3.0 mass % with respect to the total amount of the photocurable compound (C), the liquid crystal material (B), and the photopolymerization initiator (D), and the content ratio between (X) and (Y) was 2:1.8).

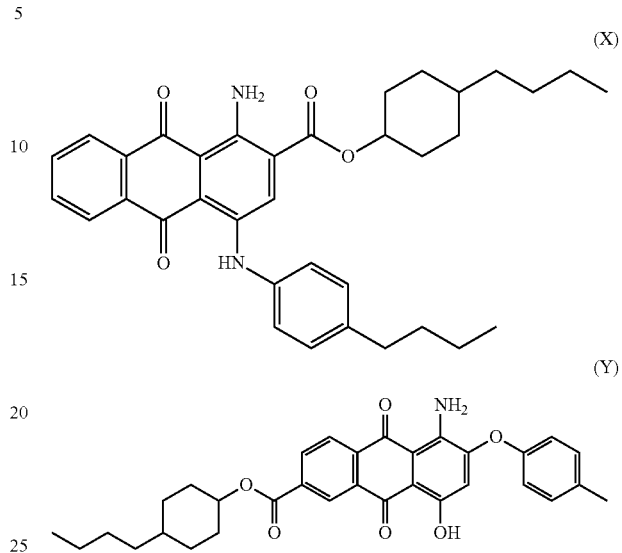

Comparative Example 2 (Preparation of Comparative Liquid Crystal Composition)

A comparative liquid crystal composition was prepared in the same manner as in Example 1 except that the dye compounds (A) were changed to 0.0090 parts of a compound represented by formula (Z), 0.0120 parts of the compound represented by No. 102 in the specific examples, and 0.0090 parts of the compound represented by No. 213 in the specific examples (the content of the dye compounds (A) was about 3.0 mass % with respect to the total amount of the photocurable compound (C), the liquid crystal material (B), and the photopolymerization initiator (D), and the content ratio between (Z) and No. 102 was 2:2.7).

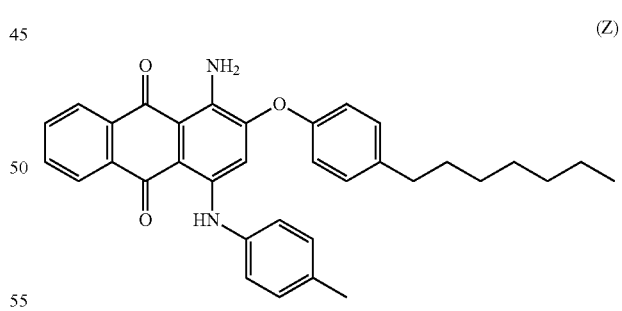

Comparative Example 3 (Preparation of Comparative Liquid Crystal Composition)

A comparative liquid crystal composition was prepared in the same manner as in Example 1 except that the dye compounds (A) were changed to 0.006 parts of the compound represented by No. 2 in the specific examples, 0.018 parts of the compound represented by No. 102 in the specific examples, and 0.006 parts of the compound represented by No. 213 in the specific examples (the content of the dye compounds (A) was about 3.0 mass % with respect to the total amount of the photocurable compound (C), the liquid crystal material (B), and the photopolymerization initiator (D), and the content ratio between No. 2 and No. 102 was 2:6).

Example 14 (Production of Light Control Element of the Present Invention)

In the liquid crystal composition obtained in Example 1, 0.010 parts of a spacer agent ("Micropearl (registered trademark) SP 220" manufactured by SEKISUI CHEMICAL CO., LTD.) having a diameter of 20 μm was mixed at room temperature. The liquid crystal composition containing the spacer agent was applied to an ITO film side of a 5-cm square PET film provided with the ITO film using an applicator to form a liquid crystal composition layer. Then, the prepared film and another 5-cm square PET film that is same as described above and is provided with an ITO film were superimposed so that the liquid crystal composition layer faced the ITO film. The thus obtained laminate of the two films and the liquid crystal composition layer was set at a position where the intensity of light from an LED lamp at 365 nm was 9 mW/cm$^2$ while being maintained at 23° C. with a thermoplate, and light irradiation was performed for 1 minute to photocure the photocurable compound, thereby obtaining a light control element of the present invention.

Examples 15 to 26 (Production of Light Control Element of the Present Invention)

A light control element of the present invention was produced in the same manner as in Example 14 except that each of the liquid crystal compositions obtained in Examples 2 to 13 was used in place of the liquid crystal composition obtained in Example 1.

Comparative Examples 4 to 6 (Production of Comparative Light Control Element)

A comparative light control element was produced in the same manner as in Example 14 except that each of the liquid crystal compositions obtained in Comparative Examples 1 to 3 was used in place of the liquid crystal composition obtained in Example 1.

(Spectral Characteristics of Light Control Elements)

For each of the light control elements obtained in Examples 14 to 26 and Comparative Examples 4 to 6, the transmittances when no voltage was applied and when a voltage (100 V) was applied were measured with a spectrophotometer, and the difference between the smallest transmittance value and the largest transmittance value among the minimum transmittances in a wavelength range of 420 to 460 nm, a wavelength range of 520 to 590 nm, and a wavelength range of 600 to 640 nm is shown in Table 11.

TABLE 11

Spectral characteristics of light control elements

| Light control element | Dye compound | Difference in minimum transmittances | |
|---|---|---|---|
| | | No voltage applied | Voltage applied |
| Example 14 | No. 2/No. 102/No. 213 | 2.8 | 1.5 |
| Example 15 | No. 2/No. 102/No. 202 | 2.0 | 4.6 |
| Example 16 | No. 1/No. 102/No. 215 | 5.1 | 3.7 |
| Example 17 | No. 25/No. 107/No 205 | 3.4 | 2.2 |
| Example 18 | No. 19/No. 101/No. 216 | 1.1 | 3.4 |
| Example 19 | No. 1/No. 102/No. 213 | 4.4 | 1.9 |
| Example 20 | No. 16/No. 102/No. 205 | 3.6 | 2.1 |
| Example 21 | No. 18/No. 101/No. 216 | 1.0 | 5.2 |
| Example 22 | No. 23/No. 102/No. 215 | 4.6 | 3.0 |
| Example 23 | No. 1/No. 101/No. 205 | 3.5 | 4.5 |
| Example 24 | No. 19/No. 101/No. 301 | 3.4 | 4.8 |
| Example 25 | No. 17/No. 102/No. 412 | 5.5 | 2.5 |
| Example 26 | No. 22/No. 101/No. 216 | 2.1 | 5.5 |
| Comp. Ex. 4 | (X)/(Y)/No. 202 | 5.9 | 7.2 |
| Comp. Ex. 5 | (Z)/No. 102/No. 213 | 5.0 | 6.5 |
| Comp. Ex. 6 | No. 2/No. 102/No. 213 | 7.8 | 12.1 |

(Hue Value a* of Light Control Elements when Voltage was Applied)

For the light control elements obtained in Examples 14 to 26 and Comparative Examples 4 to 6, the transmittance when a voltage (100 V) was applied was measured with a spectrophotometer, and the hue value a* obtained according to JIS Z 8781-4:2013 is shown in Table 12.

TABLE 12

Hue value a* of light control elements at voltage application

| Light control element | Dye compound | Hue value a* at voltage application |
|---|---|---|
| Example 14 | No. 2/No. 102/No. 213 | 1.5 |
| Example 15 | No. 2/No. 102/No. 202 | 2.2 |
| Example 16 | No. 1/No. 102/No. 215 | 1.5 |
| Example 17 | No. 25/No. 107/No. 205 | 0.7 |
| Example 18 | No. 19/No. 101/No. 216 | 1.4 |
| Example 19 | No. 1/No. 102/No. 213 | 2.0 |
| Example 20 | No. 16/No. 102/No. 205 | 2.9 |
| Example 21 | No. 18/No. 101/No. 216 | 1.0 |
| Example 22 | No. 23/No. 102/No. 215 | 0.2 |
| Example 23 | No. 1/No. 101/No. 205 | 4.6 |
| Example 24 | No. 19/No. 101/No. 301 | 4.5 |
| Example 25 | No. 17/No. 102/No. 412 | 3.8 |
| Example 26 | No. 22/No. 101/No. 216 | −0.2 |
| Comp. Ex. 4 | (X)/(Y)/No. 202 | 11.3 |
| Comp. Ex. 5 | (Z)/No. 102/No. 213 | 5.6 |
| Comp. Ex. 6 | No. 2/No. 102/No. 213 | 7.8 |

From the results in Tables 11 and 12, in the light control elements of the present invention obtained in Examples 14 to 26, the difference between the smallest transmittance value and the largest transmittance value among the minimum transmittances in a wavelength range of 420 to 460 nm, a wavelength range of 520 to 590 nm, and a wavelength range of 600 to 640 nm when a voltage was applied was as small as 6% or less, and the hue value a* was 5 or less so that the color residue in the red region during transmission was reduced. Meanwhile, in the comparative light control elements obtained in Comparative Examples 4 and 5, it was found that the difference between the smallest transmittance value and the largest transmittance value among the minimum transmittances in a wavelength range of 420 to 460 nm, a wavelength range of 520 to 590 nm, and a wavelength range of 600 to 640 nm when a voltage was applied was larger than 6%, and the hue value a* was more than 5 so that the color remained in the red region during transmission. Further, in Comparative Example 6 in which the contents of the compound represented by formula (1) and the compound represented by formula (2) were changed, it was found that the difference between the smallest transmittance value and the largest transmittance value among the minimum transmittances in a wavelength range of 420 to 460 nm, a wavelength range of 520 to 590 nm, and a wavelength range of 600 to 640 nm when no voltage was applied was larger than 6%, the hue value a* was more than 5 so that the color remained in the red region during transmission, and it was impossible to produce a black light control element.

Hereinafter, the present invention will be specifically described with reference to additional examples. As in the above-mentioned examples, the terms "part(s)" and "%" in the text are on a mass basis unless otherwise specified, and the maximum absorption wavelength is a value measured with a spectrophotometer "UV-3150" (manufactured by Shimadzu Corporation)

Example 27 (Preparation of Liquid Crystal Composition of the Present Invention)

At room temperature, 0.0085 parts of the compound represented by No. 2 in the specific examples, 0.0100 parts of the compound represented by No. 102 in the specific examples, and 0.0065 parts of the compound represented by No. 213 in the specific examples as the dye compounds (A), and the liquid crystal material (B) (0.242 parts of 1-cyano-4'-n-pentylbiphenyl, 0.118 parts of 1-cyano-4'-n-heptylbiphenyl, 0.076 parts of 1-cyano-4'-n-octyloxybiphenyl, and 0.038 parts of 1-cyano-4''-n-pentylterphenyl) were mixed to prepare a liquid crystal composition of the present invention (the content of the dye compounds (A) was about 5.0 mass % with respect to the liquid crystal material (B), and the content ratio (mass ratio) between No. 2 and No. 102 was 2:2.4).

Example 28 (Preparation of Liquid Crystal Composition of the Present Invention)

A liquid crystal composition of the present invention was prepared in the same manner as in Example 27 except that the dye compounds (A) were changed to 0.0105 parts of the compound represented by No. 2 in the specific examples, 0.0062 parts of the compound represented by No. 102 in the specific examples, and 0.0070 parts of the compound represented by No. 202 in the specific examples (the content of the dye compounds (A) was about 5.0 mass % with respect to the liquid crystal material (B), and the content ratio (mass ratio) between No. 2 and No. 102 was 2:1.2).

Example 29 (Preparation of Liquid Crystal Composition of the Present Invention)

A liquid crystal composition of the present invention was prepared in the same manner as in Example 27 except that the dye compounds (A) were changed to 0.0070 parts of the compound represented by No. 1 in the specific examples, 0.0089 parts of the compound represented by No. 102 in the specific examples, and 0.0091 parts of the compound represented by No. 215 in the specific examples (the content of the dye compounds (A) was about 5.0 mass % with respect to the liquid crystal material (B), and the content ratio (mass ratio) between No. 1 and No. 102 was 2:2.5).

Example 30 (Preparation of Liquid Crystal Composition of the Present Invention)

A liquid crystal composition of the present invention was prepared in the same manner as in Example 27 except that the dye compounds (A) were changed to 0.0078 parts of the compound represented by No. 19 in the specific examples, 0.0089 parts of the compound represented by No. 101 in the specific examples, and 0.0083 parts of the compound represented by No. 216 in the specific examples (the content of the dye compounds (A) was about 5.0 mass % with respect to the liquid crystal material (B), and the content ratio (mass ratio) between No. 19 and No. 101 was 2:2.3).

Example 31 (Preparation of Liquid Crystal Composition of the Present Invention)

A liquid crystal composition of the present invention was prepared in the same manner as in Example 27 except that the dye compounds (A) were changed to 0.0079 parts of the compound represented by No. 1 in the specific examples, 0.0106 parts of the compound represented by No. 102 in the specific examples, and 0.0065 parts of the compound represented by No. 213 in the specific examples (the content of the dye compounds (A) was about 5.0 mass % with respect to the liquid crystal material (B), and the content ratio (mass ratio) between No. 1 and No. 102 was 2:2.7).

Example 32 (Preparation of Liquid Crystal Composition of the Present Invention)

A liquid crystal composition of the present invention was prepared in the same manner as in Example 27 except that the dye compounds (A) were changed to 0.0096 parts of the compound represented by No. 23 in the specific examples, 0.0079 parts of the compound represented by No. 102 in the specific examples, and 0.0075 parts of the compound represented by No. 215 in the specific examples (the content of the dye compounds (A) was about 5.0 mass % with respect to the liquid crystal material (B), and the content ratio (mass ratio) between No. 23 and. No. 102 was 2:1.6).

Example 33 (Preparation of Liquid Crystal Composition of the Present Invention)

A liquid crystal composition of the present invention was prepared in the same manner as in Example 27 except that the dye compounds (A) were changed to 0.0110 parts of the compound represented by No. 19 in the specific examples, 0.0122 parts of the compound represented by No. 101 in the specific examples, and 0.0018 parts of the compound represented by No. 301 in the specific examples (the content of the dye compounds (A) was about 5.0 mass % with respect to the liquid crystal material (B), and the content ratio (mass ratio) between No. 19 and No. 101 was 2:2.2).

Example 34 (Preparation of Liquid Crystal Composition of the Present Invention)

A liquid crystal composition of the present invention was prepared in the same manner as in Example 27 except that the dye compounds (A) were changed to 0.0085 parts of the compound represented by No. 17 in the specific examples, 0.0130 parts of the compound represented by No. 102 in the specific examples, and 0.0035 parts of the compound represented by No. 412 in the specific examples (the content of the dye compounds (A) was about 5.0 mass % with respect to the liquid crystal material (B), and the content ratio (mass ratio) between No. 17 and No. 102 was 2:3.0).

Example 35 (Preparation of Liquid Crystal Composition of the Present Invention)

A liquid crystal composition of the present invention was prepared in the same manner as in Example 27 except that the dye compounds (A) were changed to 0.0075 parts of the compound represented by No. 22 in the specific examples, 0.0088 parts of the compound represented by No. 101 in the specific examples, and 0.0088 parts of the compound represented by No. 216 in the specific examples (the content of the dye compounds (A) was about 5.0 mass % with respect to the liquid crystal material (B), and the content ratio (mass ratio) between No. 22 and No. 101 was 2:2.3).

Example 36 (Preparation of Liquid Crystal Composition of the Present Invention)

A liquid crystal composition of the present invention was prepared in the same manner as in Example 27 except that the dye compounds (A) were changed to 0.0072 parts of the compound represented by No. 17 in the specific examples, 0.0102 parts of the compound represented by No. 107 in the specific examples, and 0.0075 parts of the compound represented by No. 213 in the specific examples (the content of the dye compounds (A) was about 5.0 mass % with respect to the liquid crystal material (B), and the content ratio (mass ratio) between No. 17 and No. 107 was 2:2.8).

Comparative Example 7 (Preparation of Comparative Liquid Crystal Composition)

A comparative liquid crystal composition was prepared in the same manner as in Example 27 except that the dye compounds (A) were changed to 0.0075 parts of the compound represented by formula (X), 0.0075 parts of the compound represented by formula (Y), and 0.0100 parts of the compound represented by No. 213 in the specific examples (the content of the dye compounds (A) was about 5.0 mass % with respect to the liquid crystal material (B), and the content ratio (mass ratio) between (X) and (Y) was 2:2.0).

Comparative Example 8 (Preparation of Comparative Liquid Crystal Composition)

A comparative liquid crystal composition was prepared in the same manner as in Example 27 except that the dye compounds (A) were changed to 0.0050 parts of the compound represented by No. 2 in the specific examples, 0.0150 parts of the compound represented by No. 102 in the specific examples, and 0.0050 parts of the compound represented by No. 213 in the specific examples (the content of the dye compounds (A) was about 5.0 mass % with respect to the liquid crystal material (B), and the content ratio (mass ratio) between No. 2 and No. 102 was 2:6.0).

Comparative Example 9 (Preparation of Comparative Liquid Crystal Composition)

A comparative liquid crystal composition was prepared in the same manner as in Example 27 except that the dye compounds (A) were changed to 0.0075 parts of the compound represented by formula (Z), 0.0100 parts of the compound represented by No. 102 in the specific examples, and 0.0075 parts of the compound represented by No. 213 in the specific examples (the content of the dye compounds (A) was about 5.0 mass % with respect to the liquid crystal material (B), and the content ratio (mass ratio) between (Z) and No. 102 was 2:2.7).

Examples 37 to 46 and Comparative Examples 10 to 12 (Production of Light Control Element of the Present Invention and Light Control Element of Comparative Light Control Element)

In an element that includes two upper and lower glass substrates each having a transparent electrode and subjected to a homogeneous alignment treatment by rubbing a polyamide-based resin on a surface to be in contact with the liquid crystal composition and that has an inter-substrate gap of 30 μm, each of the liquid crystal compositions obtained in Examples 27 to 36 and Comparative Examples 7 to 9 was sealed to prepare a light control element of the present invention or a comparative light control element. In the element subjected to the alignment treatment, when no voltage was applied, the liquid crystal material in the liquid crystal composition was in a homogeneous alignment state, and the molecules of the dye compound also had the same alignment according to the host liquid crystal.

(Spectral Characteristics and Hue Value $a^*$ during Voltage Application of Light Control Elements)

For each of the light control elements obtained in Examples 37 to 46 and Comparative Examples 10 to 12, the transmittances when no voltage was applied and when a voltage (100 V) was applied were measured with a spectrophotometer, and the difference between the smallest transmittance value and the largest transmittance value among the minimum transmittances in a wavelength range of 420 to 460 nm, a wavelength range of 520 to 590 nm, and a wavelength range of 600 to 640 nm is shown in Table 13. For the light control elements obtained in Examples 37 to 46 and Comparative Examples 10 to 12, the transmittance when a voltage (100 V) was applied was measured with a spectrophotometer, and the hue value $a^*$ obtained according to JIS Z 8781-4:2013 is shown in Table 13.

TABLE 13

| | Spectral characteristics and hue value $a^*$ at voltage application of light control elements | | | |
|---|---|---|---|---|
| Light control element | Dye compound | Difference in minimum transmittances | | Hue value $a^*$ at voltage application |
| | | No voltage applied | Voltage applied | |
| Example 37 | No. 2/No. 102/No. 213 | 2.5 | 1.0 | 0.7 |
| Example 38 | No. 2/No. 102/No. 202 | 4.0 | 4.4 | 3.4 |
| Example 39 | No. 1/No. 102/No. 215 | 5.0 | 3.7 | 3.4 |

TABLE 13-continued

Spectral characteristics and hue value a* at
voltage application of light control elements

| Light control element | Dye compound | Difference in minimum transmittances | | Hue value a* at voltage application |
|---|---|---|---|---|
| | | No voltage applied | Voltage applied | |
| Example 40 | No. 19/No. 101/No. 216 | 3.9 | 5.5 | 1.1 |
| Example 41 | No. 1/No. 102/No. 213 | 5.9 | 0.8 | 1.9 |
| Example 42 | No. 23/No. 102/No. 215 | 5.2 | 5.1 | 4.6 |
| Example 43 | No. 19/No. 101/No. 301 | 4.4 | 2.7 | 2.1 |
| Example 44 | No. 17/No. 102/No. 412 | 0.6 | 1.1 | 1.8 |
| Example 45 | No. 22/No. 101/No. 216 | 5.3 | 4.7 | 0.8 |
| Example 46 | No. 17/No. 107/No. 213 | 5.5 | 2.7 | 2.2 |
| Comp. Ex. 10 | (X)/(Y)/No. 213 | 12.3 | 10.1 | 0.9 |
| Comp. Ex. 11 | No. 2/No. 102/No. 213 | 14.1 | 8.6 | 13.1 |
| Comp. Ex. 12 | (Z)/No. 102/No. 213 | 8.1 | 4.9 | 14.5 |

From the results in Table 13, in the light control elements of the present invention obtained in Examples 37 to 46, the difference between the smallest transmittance value and the largest transmittance value among the minimum transmittances in a wavelength range of 420 to 460 nm, a wavelength range of 520 to 590 nm, and a wavelength range of 600 to 640 nm when no voltage was applied and when a voltage was applied was as small as 6% or less, and the hue value a* was 5 or less so that the color residue in the red region during transmission was reduced. Meanwhile, it was found that, in the comparative light control elements obtained in Comparative Examples 10 and 11, the difference between the smallest transmittance value and the largest transmittance value among the minimum transmittances in a wavelength range of 420 to 460 nm, a wavelength range of 520 to 590 nm, and a wavelength range of 600 to 640 nm when no voltage was applied and when a voltage was applied was larger than 6%, and in the comparative light control element obtained in Comparative Example 12, the difference between the smallest transmittance value and the largest transmittance value among the minimum transmittances in a wavelength range of 420 to 460 nm, a wavelength range of 520 to 590 nm, and a wavelength range of 600 to 640 nm when no voltage was applied was larger than 6%. Further, in the comparative light control elements obtained in Comparative Examples 11 and 12, it was found that the hue value a* greatly exceeded 5 so that a color residue in the red region during transmission was observed, and that it was impossible to produce a black light control element.

INDUSTRIAL APPLICABILITY

Since each of the liquid crystal composition of the present invention and the cured product thereof is excellent in spectral characteristics when a voltage is applied, use of the composition provides a light control element excellent in contrast and reduced in coloring when a voltage is applied. Such a light control element can be applied to a wide range of objects including vehicles such as trains and automobiles, and in windows, doors, partitions, and the like of buildings such as business buildings and hospitals.

The invention claimed is:
1. A liquid crystal composition comprising:
(A) dye compounds; and
(B) a liquid crystal material, wherein the dye compounds (A) include:
(i) an anthraquinone compound represented by general formula (1):

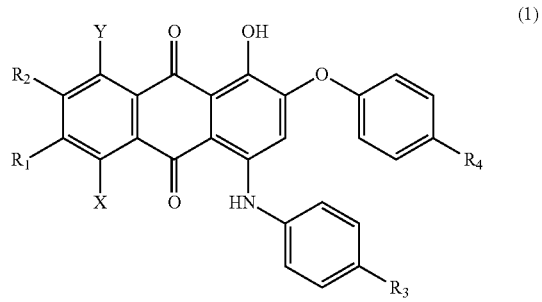

wherein one of X and Y represents a hydroxy group, and another of X and Y represents a hydrogen atom, a hydroxy group, or an amino group, one of $R_1$ and $R_2$ represents a hydrogen atom, and another of $R_1$ and $R_2$ represents a substituent represented by formula (a):

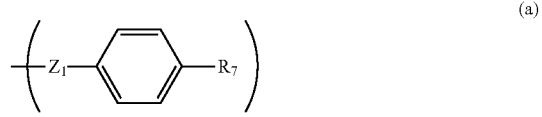

wherein $R_1$ represents a linear or branched alkyl group having 4 to 12 carbon atoms, a linear or branched alkoxy group having 4 to 12 carbon atoms, or a substituent represented by formula (b):

wherein R₈ represents a linear alkyl group having 1 to 12 carbon atoms or a branched alkyl group having 3 to 12 carbon atoms, and Z₁ represents an oxygen atom or a sulfur atom, provided that when X is a hydroxy group and Y is a hydrogen atom or an amino group, R₁ represents a substituent represented by formula (a), and R₂ represents a hydrogen atom, and when X is a hydrogen atom or an amino group and Y is a hydroxy group, R₁ represents a hydrogen atom, and R₂ represents a substituent represented by formula (a), R₃ represents a hydrogen atom, a linear alkyl group having 1 to 12 carbon atoms or a branched alkyl group having 3 to 12 carbon atoms, a linear alkoxy group having 1 to 12 carbon atoms or a branched alkoxy group having 3 to 12 carbon atoms, or a substituent represented by formula (b), and R₄ represents a linear or branched alkyl group having 4 to 12 carbon atoms, a linear or branched alkoxy group having 4 to 12 carbon atoms, or a substituent represented by formula (b);

(ii) an anthraquinone compound represented by general formula (2):

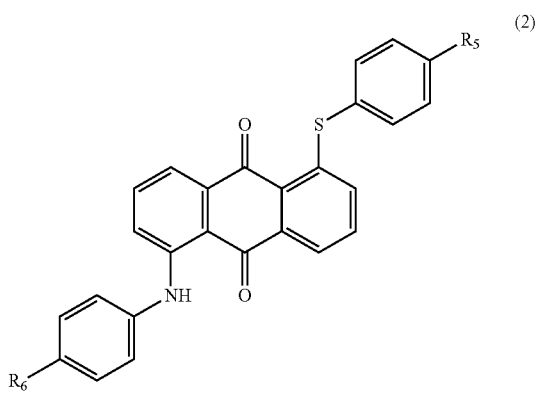

(2)

wherein R₅ represents a linear alkyl group having 1 to 18 carbon atoms or a branched alkyl group having 3 to 18 carbon atoms or a linear alkoxy group having 1 to 18 carbon atoms or a branched alkoxy group having 3 to 18 carbon atoms, and R₆ represents a linear alkyl group having 1 to 18 carbon atoms or a branched alkyl group having 3 to 18 carbon atoms, a linear alkoxy group having 1 to 18 carbon atoms or a branched alkoxy group having 3 to 18 carbon atoms, or a substituent represented by formula (b); and (iii) a dye compound other than the anthraquinone compound represented by general formula (1) or the anthraquinone compound represented by general formula (2), and a mass ratio between the anthraquinone compound represented by general formula (1) and the anthraquinone compound represented by general formula (2) is from 2:1 to 1:2.

2. The liquid crystal composition according to claim 1, wherein X is a hydroxy group, Y is an amino group, R₁ is a substituent represented by formula (a), and Z₁ is an oxygen atom.

3. The liquid crystal composition according to claim 2, wherein R₄ and R₇ are each independently a linear or branched alkyl group having 6 to 12 carbon atoms or a linear or branched alkoxy group having 6 to 12 carbon atoms.

4. The liquid crystal composition according to claim 3, wherein R₃ is a linear or branched alkyl group having 4 to 7 carbon atoms or a linear or branched alkoxy group having 4 to 7 carbon atoms.

5. The liquid crystal composition according to claim 2, wherein R₄ and R₇ are each independently a substituent represented by formula (b), and R₃ is a linear alkyl group having 1 to 8 carbon atoms or a branched alkyl group having 3 to 8 carbon atoms or a linear alkoxy group having 1 to 8 carbon atoms or a branched alkoxy group having 3 to 8 carbon atoms.

6. The liquid crystal composition according to claim 5, wherein R₄ and R₇ are each independently a substituent represented by formula (b), and R₈ is a linear or branched alkyl group having 3 to 8 carbon atoms.

7. The liquid crystal composition according to claim 1, further comprising:
   (C) a photocurable compound; and
   (D) a photopolymerization initiator.

8. The liquid crystal composition according to claim 7, wherein the photocurable compound (C) contains a monofunctional monomer having one polymerizable functional group and a bifunctional monomer having two polymerizable functional groups.

9. The liquid crystal composition according to claim 8, wherein the photocurable compound (C) contains a mono (meth) acrylate compound and a di (meth) acrylate compound.

10. A cured product of the liquid crystal composition according to claim 7.

11. A light control element comprising:
    a pair of substrates being arranged to face each other, at least one of the substrates being a transparent substrate having thereon a transparent electrode; and
    the liquid crystal composition according to claim 1 which is sandwiched between the substrates.

12. The light control element according to claim 11, having a hue value a* of 5.0 or less, the hue value a* being determined by a method defined in JIS Z 8781-4:2013 in a state where a voltage is applied between the pair of substrates.

13. The light control element according to claim 11, wherein
    when a voltage is applied between the pair of substrates, a difference between a smallest transmittance value and a largest transmittance value among minimum transmittances in a wavelength range of 420 to 460 nm, a wavelength range of 520 to 590 nm, and a wavelength range of 600 to 640 nm is 6% or less, and
    when no voltage is applied, a difference between a smallest transmittance value and a largest transmittance value among minimum transmittances in a wavelength range of 420 to 460 nm, a wavelength range of 520 to 590 nm, and a wavelength range of 600 to 640 nm is 6% or less.

14. A cured product of the liquid crystal composition according to claim 8.

15. A cured product of the liquid crystal composition according to claim 9.

16. A light control element comprising:
    a pair of substrates being arranged to face each other, at least one of the substrates being a transparent substrate having thereon a transparent electrode; and
    the cured product according to claim 10, which is Sandwiched between the substrates.

17. The light control element according to claim 16, having a hue value a* of 5.0 or less, the hue value a* being determined by a method defined in JIS Z 8781-4:2013 in a state where a voltage is applied between the pair of substrates.

18. The light control element according to claim 12, wherein
  when a voltage is applied between the pair of substrates, a difference between a smallest transmittance value and a largest transmittance value among minimum transmittances in a wavelength range of 420 to 460 nm, a wavelength range of 520 to 590 nm, and a wavelength range of 600 to 640 nm is 6% or less, and
  when no voltage is applied, a difference between a smallest transmittance value and a largest transmittance value among minimum transmittances in a wavelength range of 420 to 460 nm, a wavelength range of 520 to 590 nm, and a wavelength range of 600 to 640 nm is 6% or less.

19. The liquid crystal composition according to claim 2, further comprising:
  (C) a photocurable compound; and
  (D) a photopolymerization initiator.

20. The liquid crystal composition according to claim 3, further comprising:
  (C) a photocurable compound; and
  (D) a photopolymerization initiator.

* * * * *